United States Patent
Hagiwara

(10) Patent No.: US 10,774,636 B2
(45) Date of Patent: Sep. 15, 2020

(54) ANISOTROPY AND DIP ANGLE DETERMINATION USING ELECTROMAGNETIC (EM) IMPULSES FROM TILTED ANTENNAS

(71) Applicant: Saudi Arabian Oil Company, Dhahran (SA)

(72) Inventor: Teruhiko Hagiwara, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/230,626

(22) Filed: Dec. 21, 2018

(65) Prior Publication Data

US 2019/0112921 A1  Apr. 18, 2019

Related U.S. Application Data

(63) Continuation of application No. 15/156,964, filed on May 17, 2016, now Pat. No. 10,161,245.

(51) Int. Cl.
| | | |
|---|---|---|
| *E21B 49/00* | (2006.01) | |
| *G01V 3/28* | (2006.01) | |
| *G01V 3/30* | (2006.01) | |
| *G01V 3/38* | (2006.01) | |

(52) U.S. Cl.
CPC ............ *E21B 49/00* (2013.01); *G01V 3/28* (2013.01); *G01V 3/30* (2013.01); *G01V 3/38* (2013.01)

(58) Field of Classification Search
CPC ............ E21B 49/00; G01V 3/30; G01V 3/38
See application file for complete search history.

(56) References Cited

U.S. PATENT DOCUMENTS

| | | | | |
|---|---|---|---|---|
| 6,044,325 A | * | 3/2000 | Chakravarthy | G01V 3/38 702/7 |
| 6,181,138 B1 | | 1/2001 | Hagiwara et al. | |
| 6,393,364 B1 | * | 5/2002 | Gao | E21B 47/026 702/7 |
| 6,760,666 B2 | | 7/2004 | Hagiwara | |
| 7,265,552 B2 | | 9/2007 | Bittar | |
| 7,538,555 B2 | | 5/2009 | Banning et al. | |
| 7,755,361 B2 | | 7/2010 | Seydoux et al. | |
| 7,948,238 B2 | | 5/2011 | Bittar | |

(Continued)

FOREIGN PATENT DOCUMENTS

| | | |
|---|---|---|
| EP | 3458882 | 3/2019 |
| WO | WO 2017200629 | 11/2017 |

OTHER PUBLICATIONS

Canadian Office Action issued in Canadian Appln. No. 3,024,369, dated Oct. 7, 2019, 3 pages.

(Continued)

*Primary Examiner* — Mohamed Charioui
(74) *Attorney, Agent, or Firm* — Fish & Richardson P.C.

(57) ABSTRACT

Transient responses of a tri-axial resistivity tool corresponding to an electromagnetic (EM) impulse are derived. A transient response of a directional resistivity tool (DRT) corresponding to the EM impulse is derived based on the transient responses of the tri-axial resistivity tool. A theoretical late time transient response of the DRT is derived based on the transient response of the DRT. The late time transient response of the DRT is measured. An anisotropy, a horizontal conductivity, and a dip angle are determined based on the measured late time transient response and the theoretical late time transient response.

20 Claims, 14 Drawing Sheets

(56) References Cited

U.S. PATENT DOCUMENTS

| | | |
|---|---|---|
| 8,049,507 B2 | 11/2011 | Rabinovich et al. |
| 8,061,442 B2 | 11/2011 | Alberty |
| 8,581,592 B2 | 11/2013 | Bittar et al. |
| 8,892,362 B2 | 11/2014 | Brady et al. |
| 9,002,649 B2 | 4/2015 | Bittar et al. |
| 9,063,244 B2 | 6/2015 | Allen |
| 9,519,072 B2 | 12/2016 | Kleinberg et al. |
| 10,161,245 B2 | 12/2018 | Hagiwara |
| 2006/0038571 A1* | 2/2006 | Ostermeier ............ G01V 3/38 324/338 |
| 2007/0256832 A1* | 11/2007 | Hagiwara ............... G01V 3/28 166/250.16 |
| 2009/0138202 A1 | 5/2009 | Tang et al. |
| 2010/0213943 A1 | 8/2010 | Georgi et al. |
| 2012/0283951 A1 | 11/2012 | Li et al. |
| 2015/0160367 A1* | 6/2015 | Le ......................... G01V 3/28 324/339 |
| 2017/0160424 A1 | 6/2017 | Omeragic et al. |
| 2019/0112921 A1 | 4/2019 | Hagiwara |

OTHER PUBLICATIONS

Chinese Office Action issued in Chinese Application No. 201780040408.3 dated Nov. 5, 2019, 8 pages.

Gulf Cooperation Council Examination Report issued in GCC Application No. GC 2017-33196 dated Jan. 16, 2019, 4 pages.

T. Hagiwara; "A New Method to Determine the VTI Anisotropic Resistivity and Formation Dip"; SEG Technical Program Expanded Abstracts 2014; Aug. 5, 2014; pp. 580-584.

M. Bittar et al.; "A New Azimuthal Deep-Reading Resistivity Tool for Geosteering and Advanced Formation Evaluation"; SPE Reservoir Evaluation and Engineering; Apr. 1, 2009; pp. 1-10.

Hagiwara, Teruhiko; "Determination of Dip and Anisotropy from Transiet Triaxial Induction Measurements"; Geophysics, Society of Exploration Geophysicists, US; vol. 77, No. 4; Jul. 1, 2012; pp. D105-D112.

International Search Report and Written Opinion of the International Searching Authority issued in International Application No. PCT/US2017/020391 dated May 23, 2017; 11 pages.

European Communication pursuant to Rules 161(1) and 162 EPC issued in European Application No. 17716329.2 dated Jan. 3, 2019, 3 pages.

Communication under Rule 71(3) EPC issued in European Application No. Oct. 22, 2019, 54.

Nekut, "Anisotropy Induction Logging," Geophysics, vol. 59, No. 3, Mar. 1994, 6 pages.

\* cited by examiner

ANISOTROPY AND DIP ANGLE DETERMINATION USING ELECTROMAGNETIC (EM) IMPULSES FROM TILTED ANTENNAS

BACKGROUND

In operations such as geo-steering, used to navigate drilling (for example, petroleum) for better well placement, a Logging-While-Drilling (LWD) tool is typically used to map an underground formation both around and ahead of the tool. The depth of investigation is generally limited around the tool if using a conventional electromagnetic (EM) wave. The use of an EM impulse generated by near-instantaneously shutting off a constant transmitter current makes it possible to foresee changes in the underground formation, both around and ahead of the tool. However, it typically takes a set of three mutually orthogonal transmitters and a set of three mutually orthogonal receivers for measuring formation around and ahead of the tool and a dip angle.

SUMMARY

The present disclosure relates to anisotropy and dip angle determination using electromagnetic (EM) impulses from tilted antennas.

Transient responses of a tri-axial resistivity tool corresponding to an electromagnetic (EM) impulse are derived. A transient response of a directional resistivity tool (DRT) corresponding to the EM impulse is derived based on the transient responses of the tri-axial resistivity tool. A theoretical late time transient response of the DRT is derived based on the transient response of the DRT. The late time transient response of the DRT is measured. An anisotropy, a horizontal conductivity, and a dip angle are determined based on the measured late time transient response and the theoretical late time transient response.

Some implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, causes the system to perform the actions. One or more computer programs can be configured to perform particular operations or actions by virtue of including instructions that, when executed by data processing apparatus, cause the apparatus to perform the actions.

For example, in a first implementation of a computer-implemented method, the first implementation includes: deriving transient responses of a tri-axial resistivity tool corresponding to an electromagnetic (EM) impulse; deriving a transient response of a directional resistivity tool (DRT) corresponding to the EM impulse based on the transient responses of the tri-axial resistivity tool; deriving a theoretical late time transient response of the DRT based on the transient response of the DRT; measuring the late time transient response of the DRT; and determining an anisotropy, a horizontal conductivity, and a dip angle based on the measured late time transient response and the theoretical late time transient response.

The foregoing and other implementations can each optionally include one or more of the following aspects, alone or in combination:

A first aspect, combinable with the general implementation and any of the following aspects, wherein the DRT includes one transmitter and one receiver, at least one of a dipole of the transmitter or a dipole of the receiver tilted from a tool axis.

A second aspect, combinable with any of the previous or following aspects, wherein the tri-axial resistivity tool includes three mutually orthogonal transmitters and three mutually orthogonal receivers, the transmitters and the receivers of the tri-axial resistivity tool co-located with the transmitter and the receiver of the DRT, respectively.

A third aspect, combinable with any of the previous or following aspects, wherein deriving the theoretical late time transient response includes having a time in the transient response approach to a large value.

A fourth aspect, combinable with any of the previous or following aspects, wherein measuring the late time transient response includes measuring the late time transient response at different azimuth angles.

A fifth aspect, combinable with any of the previous or following aspects, wherein determining the anisotropy, the horizontal conductivity, and the dip angle includes choosing the anisotropy, the horizontal conductivity, and the dip angle such that a difference between the measured late time transient response and the theoretical late time transient response is minimized.

A sixth aspect, combinable with any of the previous or following aspects, wherein the anisotropy is at least one of a resistivity anisotropy or a conductivity anisotropy.

In a second implementation of a non-transitory computer-readable medium, the second implementation includes one or more instructions executable by a computer system to perform operations comprising: deriving transient responses of a tri-axial resistivity tool corresponding to an electromagnetic (EM) impulse; deriving a transient response of a directional resistivity tool (DRT) corresponding to the EM impulse based on the transient responses of the tri-axial resistivity tool; deriving a theoretical late time transient response of the DRT based on the transient response of the DRT; measuring the late time transient response of the DRT; and determining an anisotropy, a horizontal conductivity, and a dip angle based on the measured late time transient response and the theoretical late time transient response.

The foregoing and other implementations can each optionally include one or more of the following features, alone or in combination:

A first aspect, combinable with the general implementation and any of the following aspects, wherein the DRT includes one transmitter and one receiver, at least one of a dipole of the transmitter or a dipole of the receiver tilted from a tool axis.

A second aspect, combinable with any of the previous or following aspects, wherein the tri-axial resistivity tool includes three mutually orthogonal transmitters and three mutually orthogonal receivers, the transmitters and the receivers of the tri-axial resistivity tool co-located with the transmitter and the receiver of the DRT, respectively.

A third aspect, combinable with any of the previous or following aspects, wherein deriving the theoretical late time transient response includes having a time in the transient response approach to a large value.

A fourth aspect, combinable with any of the previous or following aspects, wherein measuring the late time transient response includes measuring the late time transient response at different azimuth angles.

A fifth aspect, combinable with any of the previous or following aspects, wherein determining the anisotropy, the horizontal conductivity, and the dip angle includes choosing the anisotropy, the horizontal conductivity, and the dip angle such that a difference between the measured late time transient response and the theoretical late time transient response is minimized.

A sixth aspect, combinable with any of the previous or following aspects, wherein the anisotropy is at least one of a resistivity anisotropy or a conductivity anisotropy.

In a third implementation of a computer-implemented system, the third implementation includes a computer memory; and a hardware processor interoperably coupled with the computer memory and configured to perform operations comprising: deriving transient responses of a tri-axial resistivity tool corresponding to an electromagnetic (EM) impulse; deriving a transient response of a directional resistivity tool (DRT) corresponding to the EM impulse based on the transient responses of the tri-axial resistivity tool; deriving a theoretical late time transient response of the DRT based on the transient response of the DRT; measuring the late time transient response of the DRT; and determining an anisotropy, a horizontal conductivity, and a dip angle based on the measured late time transient response and the theoretical late time transient response.

The foregoing and other implementations can each optionally include one or more of the following features, alone or in combination:

A first aspect, combinable with the general implementation and any of the following aspects, wherein the DRT includes one transmitter and one receiver, at least one of a dipole of the transmitter or a dipole of the receiver tilted from a tool axis.

A second aspect, combinable with any of the previous or following aspects, wherein the tri-axial resistivity tool includes three mutually orthogonal transmitters and three mutually orthogonal receivers, the transmitters and the receivers of the tri-axial resistivity tool co-located with the transmitter and the receiver of the DRT, respectively.

A third aspect, combinable with any of the previous or following aspects, wherein deriving the theoretical late time transient response includes having a time in the transient response approach to a large value.

A fourth aspect, combinable with any of the previous or following aspects, wherein measuring the late time transient response includes measuring the late time transient response at different azimuth angles.

A fifth aspect, combinable with any of the previous or following aspects, wherein determining the anisotropy, the horizontal conductivity, and the dip angle includes choosing the anisotropy, the horizontal conductivity, and the dip angle such that a difference between the measured late time transient response and the theoretical late time transient response is minimized.

The subject matter described in this specification can be implemented in particular implementations so as to realize one or more of the following advantages. First, the described subject matter measures attributes of a formation (such as anisotropy and other attributes) both around and ahead of a tool by using EM impulses, making it possible to look-ahead of a resistive anomaly and to determine a distance to the anomaly. Second, instead of using multiple transmitters and receivers as in existing approaches, the described subject matter can be used to measure anisotropy and a dip angle using one transmitter and one receiver, where at least one of the transmitter or receiver is tilted from the tool axis. The use of one transmitter and one receiver enables a small tool size. In some implementations, the tool can be made even smaller by co-locating the transmitter and the receiver because an offset between the transmitter and the receiver does not affect a depth of investigation ahead of the tool when EM pulses are used. The use of one transmitter and one receiver also makes the tool easy to implement. Third, by co-locating the transmitter and the receiver, the described subject matter can increase an investigation area ahead of the tool. Fourth, the described subject matter can be used to improve measurements of received signals by using EM impulses, because measurements are performed while an EM impulse-emitting transmitter is off; therefore transmitter-induced noise is mitigated or eliminated. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
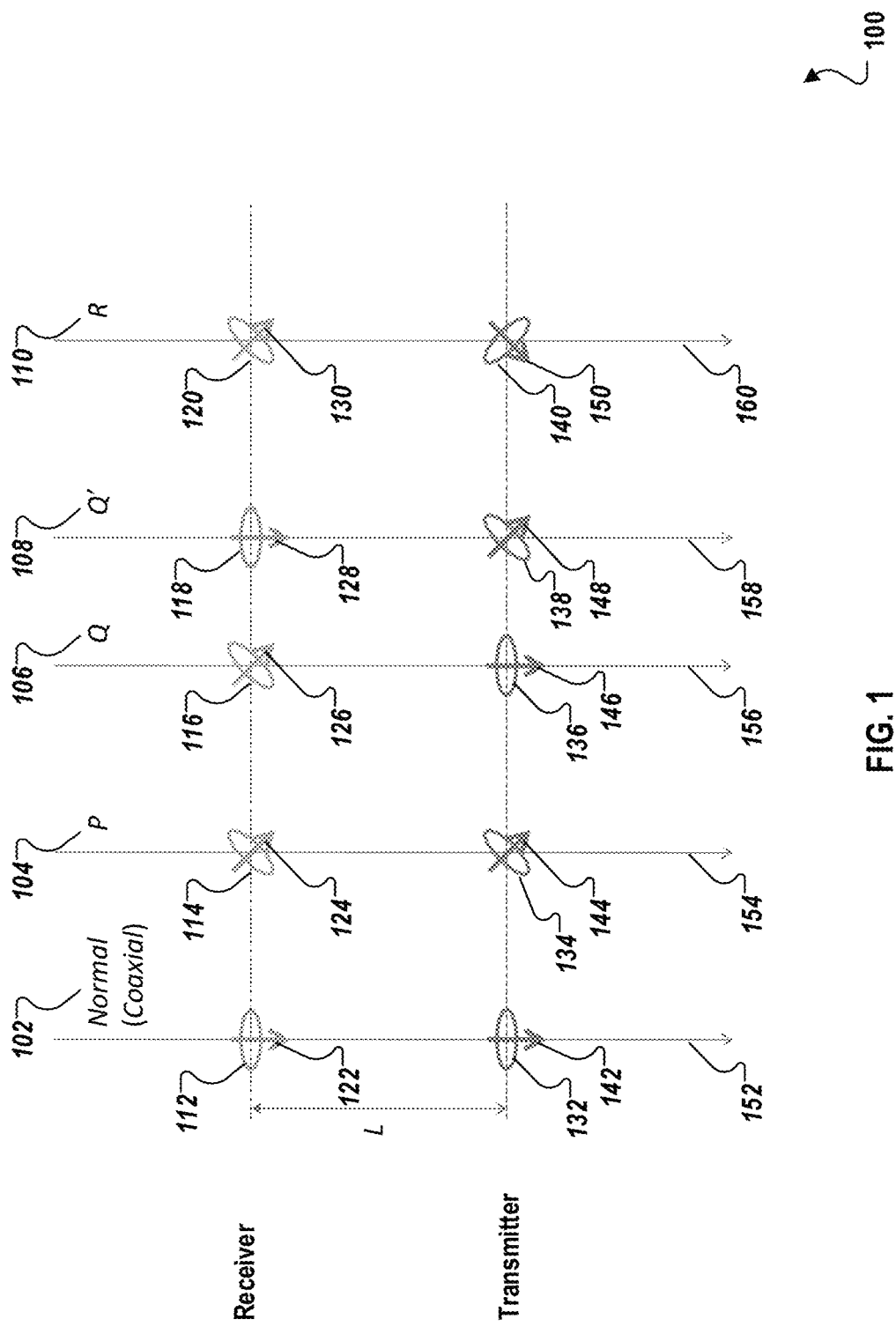
FIG. 1 illustrates a general representation of a conventional coaxial resistivity tool and a set of directional resistivity tools (DRTs), according to an implementation.

The present detailed description relates to anisotropy and dip angle determination using electromagnetic (EM)

impulses from tilted antennas and is presented to enable any person of ordinary skill in the art to make, use, and practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be necessarily limited to the described or illustrated implementations, but is to be accorded the widest scope consistent with the principles and features disclosed herein.

For the purposes of this disclosure, the terms "real-time," "real time," "realtime," "real (fast) time (RFT)," "near(ly) real-time (NRT)," "quasi real-time," "instantaneous", "near(ly)-instantaneous" or similar terms (as understood by one of ordinary skill in the art) mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data.

Resistivity/conductivity anisotropy is an important characteristic of underground formations. In existing approaches, to measure anisotropy both around and ahead of a drilling tool, an EM impulse is transmitted around the tool by turning the transmitter first on and then off very quickly. The EM impulse diffused through media (for example, earth, rock, sand, and the like) around the tool is measured at receivers. The diffused EM impulse received after the transmitter shuts off is called a transient response. The transient response can be used to determine the resistivity/conductivity of the formation around the tool. When there is a resistivity/conductivity anomaly, or the boundary to adjacent beds is of different resistivity/conductivity, the transient response changes when the EM impulse reflects off of the anomaly or boundary. The distance to the anomaly/boundary is measured from the transition/diffusion time when the transient response experiences a sudden change. Because a received reflected EM impulse from the region ahead of the tool is significantly weaker compared to signals from other regions around the tool, a tri-axial resistivity tool, which includes three mutually orthogonal transmitters (also called tri-axial transmitters) and three mutually orthogonal receivers (also called tri-axial receivers), is typically used to collect enough returned EM impulse from the region ahead of the tool. However, implementing such multiple transmitters and receivers in a drilling tool poses challenges due to a large size as well as implementation complexities Instead of using multiple transmitters and receivers, the described approach can measure resistivity/conductivity anisotropy and a dip angle (that is, the angle between the formation and the borehole) using one transmitter and one receiver as part of a directional resistivity tool (DRT), where at least one of the transmitter or receiver is tilted from the axis of the DRT. The described approach provides a method to estimate the anisotropy and the dip angle based on a transient response of an EM impulse received at the DRT. A theoretical transient response of a DRT is first derived based on transient responses of a tri-axial resistivity tool, assuming that the DRT and the tri-axial resistivity tool are co-located. It is also shown that the theoretical DRT transient response is a function of the anisotropy and the dip angle. That is, different anisotropies and dip angles lead to different theoretical DRT transient responses. The actual transient response of the DRT can then be measured while the DRT rotates in the borehole. The anisotropy and the dip angle can be determined by choosing anisotropy and a dip angle such that the theoretical transient response best matches the measured transient response.

In particular, the described approach examines the transient response of a DRT in a homogenous vertical transverse isotropy (VTI) anisotropic formation when the tool is tilted from a vertical axis. A VTI anisotropic formation is often observed in thinly layered formations and shale layers. As the DRT rotates in the borehole, the azimuthal responses of the DRT are measured and used to determine both the VTI anisotropy and the dip angle.

FIG. 1 illustrates a general representation of a conventional coaxial resistivity tool and a set of DRTs 100, according to an implementation. A conventional coaxial resistivity tool 102 typically includes a receiver loop antenna 112 with an equivalent receiver dipole 122 and a transmitter loop antenna 132 with an equivalent transmitter dipole 142, where both the receiver dipole 122 and the transmitter dipole 142 are aligned coaxially along a tool axis (that is, a borehole axis) 152. The set of DRTs in 100 includes various DRT configurations such as DRT-P 104, DRT-Q 106, DRT-Q' 108, and DRT-R 110. The DRT-P 104 includes a receiver loop antenna 114 with an equivalent receiver dipole 124 and a transmitter loop antenna 134 with an equivalent transmitter dipole 144, where both the receiver dipole 124 and the transmitter dipole 144 are tilted from a tool axis 154. The receiver dipole 124 and the transmitter dipole 144 are tilted in the same direction from the tool axis 154 and parallel to each other. The DRT-Q 106 includes a receiver loop antenna 116 with an equivalent receiver dipole 126 and a transmitter loop antenna 136 with an equivalent transmitter dipole 146, where the receiver dipole 126 is tilted from a tool axis 156 and the transmitter dipole 146 is aligned with the tool axis 156. The DRT-Q' 108 includes a receiver loop antenna 118 with an equivalent receiver dipole 128 and a transmitter loop antenna 138 with an equivalent transmitter dipole 148, where the receiver dipole 128 is aligned with a tool axis 158 and the transmitter dipole 148 is tilted from the tool axis 158. The DRT-R 110 includes a receiver loop antenna 120 with an equivalent receiver dipole 130 and a transmitter loop antenna 140 with an equivalent transmitter dipole 150, where both the receiver dipole 130 and the transmitter dipole 150 are tilted from a tool axis 160. The receiver dipole 130 and the transmitter dipole 150 are tilted in different directions from the tool axis 160 and perpendicular to each other. In the illustrated generally represented resistivity tools 102, 104, 106, 108 and 110, the distance between the transmitter and the receiver is denoted as L. In DRT-P 104, DRT-Q 106, DRT-Q' 108, and DRT-R 110, the tilted receiver or transmitter dipole is tilted about 45° from the corresponding tool axis. As will be appreciated by those of ordinary skill in the art, other tilt angles can also be used. Illustrated example tilt angles are not meant to limit the disclosure in any way. In the configurations such as DRT-P 104 and DRT-R 110, where both the receiver dipole and the transmitter dipole are tilted from the tool axis, the tilt angles of the transmitter dipole and the receiver dipole can be different.

Figure 2:
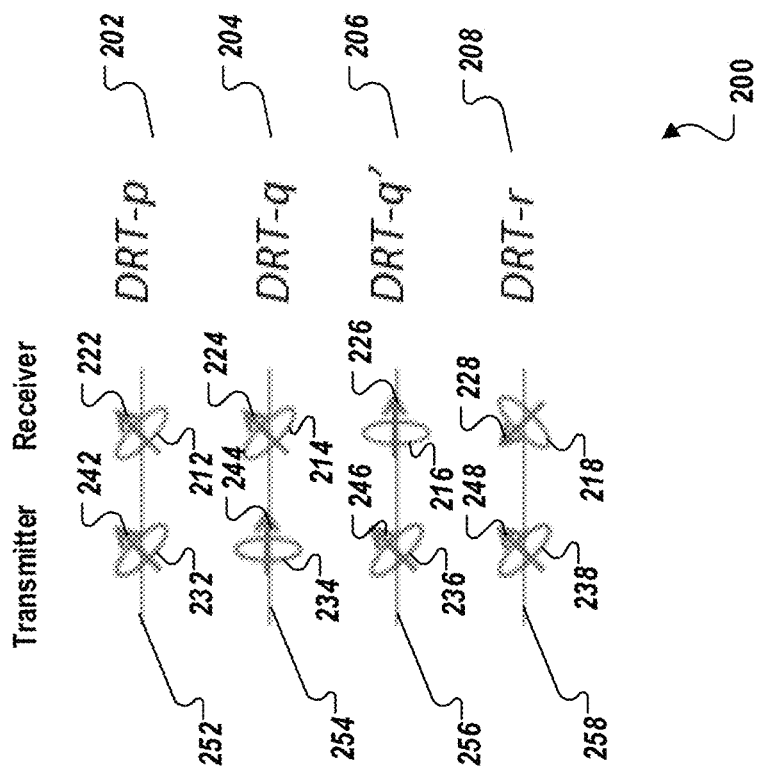
FIG. 2 illustrates a general representation of a second set of DRTs, according to an implementation.

FIG. 2 illustrates a general representation of a second set of DRTs 200, according to an implementation. The second set of DRTs 200 includes various DRT configurations such as DRT-p 202, DRT-q 204, DRT-q' 206, and DRT-r 208. The DRT-p 202 includes a receiver loop antenna 212 with an equivalent receiver dipole 222 and a transmitter loop antenna 232 with an equivalent transmitter dipole 242, where both the receiver dipole 222 and the transmitter dipole 242 are tilted from a tool axis 252. The receiver dipole 222 and the transmitter dipole 242 are parallel to each other, both tilted in the same direction about 45° from the tool axis 252. The DRT-q 204 includes a receiver loop antenna 214 with an equivalent receiver dipole 224 and a transmitter loop antenna 234 with an equivalent transmitter dipole 244, where the receiver dipole 224 is tilted about 45° from a tool axis 254 and the transmitter dipole 244 is aligned with the tool axis 254. The DRT-q' 206 includes a receiver loop antenna 216 with an equivalent receiver dipole 226 and a transmitter loop antenna 236 with an equivalent transmitter dipole 246, where the receiver dipole 226 is aligned with a tool axis 256 and the transmitter dipole 246 is tilted about 45° from the tool axis 256. The DRT-r 208 includes a receiver loop antenna 218 with an equivalent receiver dipole 228 and a transmitter loop antenna 238 with an equivalent transmitter dipole 248, where the receiver dipole 228 and the transmitter dipole 248 are perpendicular to each other, both tilted about 45° from a tool axis 258, but in different directions.

Figure 3:
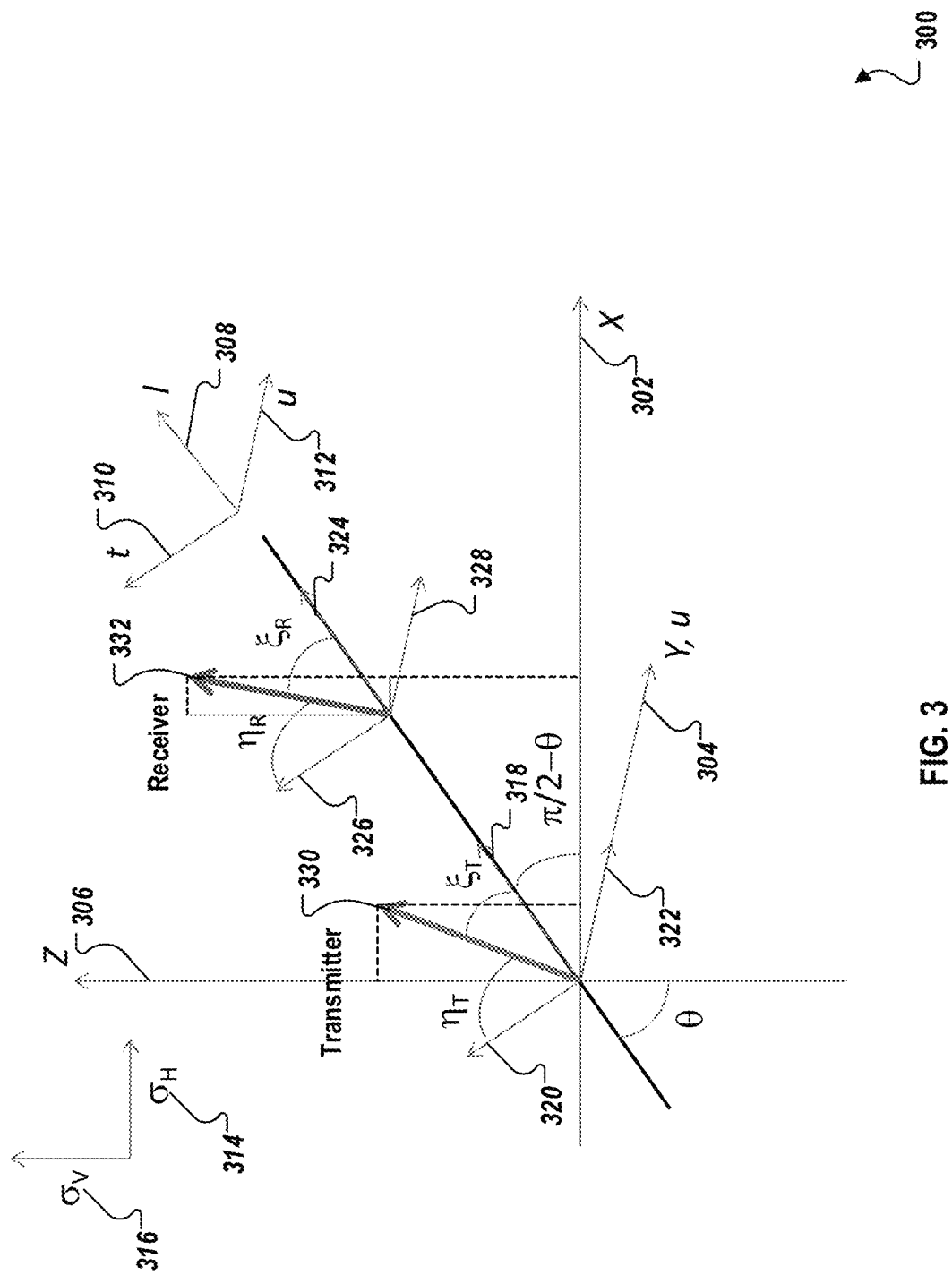
FIG. 3 illustrates parameters associated with a resistivity tool system within an anisotropic formation, according to an implementation.

FIG. 3 illustrates parameters associated with a resistivity tool system 300 in an anisotropic formation, according to an implementation. The tool system 300 includes an earth coordinate system and a borehole coordinate system. The earth coordinate system is formed by an X-axis 302 in the East, a Y-axis 304 in the North, and a Z-axis 306 in a vertical direction, where three axes are perpendicular to each other. The borehole coordinate system is formed by an 1-axis 308, a t-axis 310, and a u-axis 312 perpendicular to each other. The 1-axis 308 can also be called a borehole axis or a tool axis, aligned with the borehole orientation and the tool orientation. The 1-axis 308 and the t-axis 310 are within the plane formed by the X-axis 302 and Z-axis 308. The u-axis 312, that is perpendicular to both 1-axis 308 and t-axis 310, is parallel to the Y-axis 304. As illustrated, the borehole is deviated by θ from the vertical Z-axis 308, that is, the dip angle between the formation and the borehole is θ. The homogeneous anisotropic formation is characterized by horizontal conductivity $\sigma_H$ 314 and vertical conductivity $\sigma_V$ 316. The conductivity anisotropy is defined by $\alpha^2 = \sigma_V/\sigma_H$. The formation can also be characterized by horizontal resistivity $R_H$ and vertical conductivity $R_V$, with the resistivity anisotropy defined by $1/\alpha 2 = R_V/R_H$.

Considering a tri-axial resistivity tool in the borehole in FIG. 3, the tri-axial resistivity tool would have three mutually orthogonal transmitter dipoles 318, 320, and 322 and three mutually orthogonal receiver dipoles 324, 326, and 328, aligning with the 1-axis 308, t-axis 310, and u-axis 312. The distance between the transmitters and the receivers is L. Transient responses of the tri-axial resistivity tool, in a homogeneous anisotropic formation, can be derived. The transient response is the transient data at a receiver multiplied by $4\pi L^3$ for a unit transmitter moment 1 Am² and a unit receiver moment 1 Am².

For the coaxial transmitter 318 and receiver 324, that are coaxially aligned with the tool axis 308, the coaxial transient response $V_{ll}(t)$ with respect to time is given by:

$$V_{ll}(t) = C\frac{(\mu_0\sigma_H)^{\frac{3}{2}}}{8t^{\frac{5}{2}}}e^{-u^2}\left\{ 1 + \frac{1}{2}(\beta^2 e^{-u^2(\beta^2-1)} - 1) - \frac{1}{4u^2}(e^{-u^2(\beta^2-1)} - 1) \right\}, \quad (1)$$

where t is the time, $$\beta = \sqrt{1 + (\alpha^2 - 1)\sin^2\theta}, \ \alpha^2 = \frac{\sigma_V}{\sigma_H}, u^2 = \frac{\mu_0\sigma_H}{4t}L^2, C = \frac{M\mu_0}{\pi^{\frac{3}{2}}}\pi\rho^2,$$

$\alpha^2$ is the conductivity anisotropy, θ is the dip angle, $\sigma_H$ is the horizontal conductivity, $\sigma_V$ is the vertical conductivity, L is the distance between the transmitter and the receiver, C is a constant, $\mu_0$ is the magnetic permeability of vacuum, M is the strength of the magnetic dipole moment of the transmitter, and ρ is the radius of transmitter loop antenna.

For the coplanar transmitter 320 and receiver 326, that are parallel to each other and perpendicular to the tool axis 308, the coplanar transient response $V_{tt}(t)$ is given by:

$$V_{tt}(t) = C\frac{(\mu_0\sigma_H)^{\frac{3}{2}}}{8t^{\frac{5}{2}}}e^{-u^2}\left\{[1-u^2] + \frac{\cos^2\theta}{\sin^2\theta}\left[\frac{\frac{1}{2}(\beta^2 e^{-u^2(\beta^2-1)}-1)-}{\frac{1}{4u^2}(e^{-u^2(\beta^2-1)}-1)}\right]\right\}. \quad (2)$$

For the coplanar transmitter 322 and receiver 328, that are parallel to each other and perpendicular to the tool axis 308, the coplanar transient response $V_{uu}(t)$ is given by:

$$V_{uu}(t) = \quad (3)$$

$$C\frac{(\mu_0\sigma_H)^{\frac{3}{2}}}{8t^{\frac{5}{2}}}e^{-u^2}\left\{[1-u^2] - \frac{1}{\sin^2\theta}\left[\frac{\frac{1}{2}(\beta^2 e^{-u^2(\beta^2-1)}-1)-}{\frac{1}{4u^2}(e^{-u^2(\beta^2-1)}-1)}\right] + \frac{1}{2}[\alpha^2(3-2u^2\beta^2)e^{-u^2(\beta^2-1)} - (3-2u^2)]\right\}.$$

For the transmitter 320 and receiver 324, that are perpendicular to each other, the cross-component transient response $V_{lt}(t)$ is given by:

$$V_{lt}(t) = C\frac{(\mu_0\sigma_H)^{\frac{3}{2}}}{8t^{\frac{5}{2}}}e^{-u^2}\left\{\frac{\cos\theta}{\sin\theta}\left[\frac{\frac{1}{2}(\beta^2 e^{-u^2(\beta^2-1)}-1)-}{\frac{1}{4u^2}(e^{-u^2(\beta^2-1)}-1)}\right]\right\}. \quad (4)$$

In a homogeneous formation, the cross-component transient response $V_{tl}(t)$ is given by:

$$V_{tl}(t) = V_{lt}(t) \quad (5).$$

As time t increases, $$u^2 = \frac{\mu_0\sigma_H}{4t}L^2 \to 0,$$

it can be shown that the transient responses in equations (1)-(4) approach to the following late time transient responses:

$$V_{ll}(t) \to C\frac{(\mu_0\sigma_H)^{\frac{3}{2}}}{8t^{\frac{5}{2}}}\left\{1 + \frac{3}{4}(\alpha^2-1)\sin^2\theta\right\}, \quad (6)$$

-continued $$V_{tt}(t) \to C\frac{(\mu_0\sigma_H)^{\frac{3}{2}}}{8t^{\frac{5}{2}}}\left\{1 + \frac{3}{4}(\alpha^2 - 1)\cos^2\theta\right\}, \quad (7)$$

$$V_{uu}(t) \to C\frac{(\mu_0\sigma_H)^{\frac{3}{2}}}{8t^{\frac{5}{2}}}\left\{1 + \frac{3}{4}(\alpha^2 - 1)\right\}, \text{ and} \quad (8)$$

$$V_{lt}(t) \to C\frac{(\mu_0\sigma_H)^{\frac{3}{2}}}{8t^{\frac{5}{2}}}\left\{\frac{3}{4}(\alpha^2 - 1)\cos\theta\sin\theta\right\}. \quad (9)$$

It can be shown that the dip angle θ can be determined algebraically from the tri-axial transient responses in equations (1)-(5) by solving:

$$\tan(2\theta) = \frac{V_{lt}(t) + V_{tl}(t)}{V_{ll}(t) - V_{tt}(t)}\bigg|_{t \to large}. \quad (10)$$

Similarly, the conductivity anisotropy $\alpha^2$ can be determined, based on the transient responses in equations (1)-(5), by solving, for example:

$$\left[\frac{V_{ll}(t) - V_{tt}(t)}{V_{ll}(t) + V_{tt}(t)}\right]_{t \to large} = -\frac{\alpha^2 - 1}{\alpha^2 + \frac{5}{3}}\cos 2\theta \quad (11)$$

or $$\frac{V_{ll}(t) + V_{tt}(t)}{2V_{uu}(t)}\bigg|_{t \to large} = \frac{1 + \frac{3}{8}(\alpha^2 - 1)}{1 + \frac{3}{4}(\alpha^2 - 1)}. \quad (12)$$

Now back to FIG. 3, consider a DRT in the borehole, where the DRT transmitter and receiver are co-located with the tri-axial transmitters and receivers, respectively. The DRT has a transmitter dipole 330 and a receiver dipole 332 which are tilted from the borehole axis 308 by polar angles $\xi_T$ and $\xi_R$, respectively, and rotated around the borehole axis by azimuth angles $\eta_T$ and $\eta_R$, respectively, when the DRT rotates inside the borehole. In other words, the azimuth angle $\eta_T$ is the angle between the tri-axial transmitter dipole 320 and the DRT transmitter dipole 330, and the azimuth angle $\eta_R$ is the angle between the tri-axial receiver dipole 326 and the DRT receiver dipole 332. The distance between the transmitter and the receiver is L. Transient responses of the DRT in a homogeneous anisotropic formation can be derived.

For a DRT-p 202 illustrated in FIG. 2 where the transmitter and receiver dipoles are tilted and parallel to each other with $\xi_T = \xi_R = \xi$ and $\eta_T = \eta_R = \eta$, based on equations (1)-(5), the DRT-p transient response is given by:

$$V_{DRT-p}(t) = \quad (13)$$

$$V_{ll}(t)\cos^2\xi + (V_{lt}(t) + V_{tl}(t))\cos\xi\sin\xi\cos\eta + V_{tt}(t)\sin^2\xi\cos^2\eta +$$

$$V_{uu}(t)\sin^2\xi\sin^2\eta = C\frac{(\mu_0\sigma_H)^{\frac{3}{2}}}{8t^{\frac{5}{2}}}e^{-u^2}\left\{\cos^2\xi + [1 - u^2]\sin^2\xi + \right.$$

-continued $$\left[\frac{1}{2}(\beta^2 e^{-u^2(\beta^2-1)} - 1) - \right.$$
$$\left.\frac{1}{4u^2}(e^{-u^2(\beta^2-1)} - 1)\right]\left(\cos^2\xi + \frac{1}{\sin^2\theta}(\cos^2\theta\sin^2\xi\cos^2\eta - \right.$$

$$\sin^2\xi\sin^2\eta + 2\sin\theta\cos\theta\cos\xi\sin\xi\cos\eta)\right) +$$

$$\left.\sin^2\xi\sin^2\eta\frac{1}{2}[\alpha^2(3 - 2\mu^2\beta^2)e^{-u^2(\beta^2-1)} - (3 - 2u^2)]\right\},$$

where $\xi$ is the tilt angle of the transmitter and receiver dipoles, η is the azimuth angle, $$\beta = \sqrt{1 + (\alpha^2 - 1)\sin^2\theta} \text{ and } \alpha^2 = \frac{\sigma_V}{\sigma_H}.$$

For a DRT-q 204 illustrated in FIG. 2 where the transmitter is axial with $\xi_T = 0$ and the receiver is tilted by polar angle $\xi_R = \xi$, and rotated by azimuth $\eta_R = \eta$, based on equations (1)-(5), the DRT-q transient response is given by:

$$V_{DRT-p}(t) = V_{ll}(t)\cos\xi + V_{lt}(t)\sin\xi\cos\eta = \quad (14)$$

$$C\frac{(\mu_0\sigma_H)^{\frac{3}{2}}}{8t^{\frac{5}{2}}}\left\{e^{-u^2}\left\{1 + \frac{1}{2}(\beta^2 e^{-u^2(\beta^2-1)} - 1) - \right.\right.$$
$$\left.\left.\frac{1}{4u^2}(e^{-u^2(\beta^2-1)} - 1)\right\}\cos\xi + \right.$$
$$\left.\left[\frac{\cos\theta}{\sin\theta}\right]\left[\frac{1}{2}(\beta^2 e^{-u^2(\beta^2-1)} - 1) - \right.\right.$$
$$\left.\left.\frac{1}{4u^2}(e^{-u^2(\beta^2-1)} - 1)\right]\right\}\sin\xi\cos\eta\right\}.$$

For a DRT-r 208 illustrated in FIG. 2, where the transmitter and receiver dipoles are tilted and perpendicular to each other with $\xi_T = \xi$, $\xi_R = \pi - \xi$, and $\eta_T = \eta_R = \eta$, based on equations (1)-(5), the DRT-r transient response is given by:

$$V_{DRT-r}(t) = \quad (15)$$

$$V_{ll}(t)\cos^2\xi + V_{tt}(t)\sin^2\xi\cos^2\eta + V_{uu}(t)\sin^2\xi\cos^2\eta = C\frac{(\mu_0\sigma_H)^{\frac{3}{2}}}{8t^{\frac{5}{2}}}e^{-u^2}$$

$$\left\{(1 - u^2)\sin^2\xi - \cos^2\xi - \right.$$
$$\left.\left(\cos^2\xi - \right.\right.$$
$$\left.\left.\frac{1}{\sin^2\theta}\sin^2\xi(\cos^2\theta\cos^2\eta - \right.\right.$$
$$\left.\left.\sin^2\eta)\right)\left[\frac{1}{2}(\beta^2 e^{-u^2(\beta^2-1)} - 1) - \right.\right.$$
$$\left.\left.\frac{1}{4u^2}(e^{-u^2(\beta^2-1)} - 1)\right] + \right.$$
$$\left.\frac{1}{2}\sin^2\xi\sin^2\eta[\alpha^2(3 - 2u^2\beta^2)e^{-u^2(\beta^2-1)} - (3 - 2u^2)]\right\}.$$

Note that the transient response for a conventional coaxial tool (for example, the tool 102 in FIG. 1) with $\xi_T = \xi_R = 0$ is given by:

$$V(t) = C\frac{(\mu_0\sigma_H)^{\frac{3}{2}}}{8t^{\frac{5}{2}}}e^{-u^2}\left\{1 + \begin{bmatrix}\frac{1}{2}(\beta^2 e^{-u^2(\beta^2-1)} - 1) - \\ \frac{1}{4u^2}(e^{-u^2(\beta^2-1)} - 1)\end{bmatrix}\right\}. \quad (16)$$

As V(t) depends on the conductivity anisotropy $\alpha^2$ and the dip angle $\theta$ through $\beta=\sqrt{1+(\alpha^2-1)\sin^2\theta}$, the coaxial tool measurement V(t) can be used to determine $\beta$, but not individual $\alpha^2$ or $\theta$ unless one of them is known.

From equations (13)-(15), it can be seen that, for a given conductivity anisotropy and dip angle, the transient response of any DRT configuration varies with respect to the azimuth angle $\eta$. FIGS. 4-12 show relative amplitudes of late time DRT transient responses with respect to azimuth change for various values of anisotropy and dip angle, illustrating that late time transient responses with respect to azimuth variation are different for different dip angles and anisotropies. In other words, for a given dip angle and anisotropy, a late time transient response with respect to azimuth variation is unique. By measuring a late time transient response with respect to azimuth variation, an associated anisotropy and dip angle can be determined.

Figure 4:
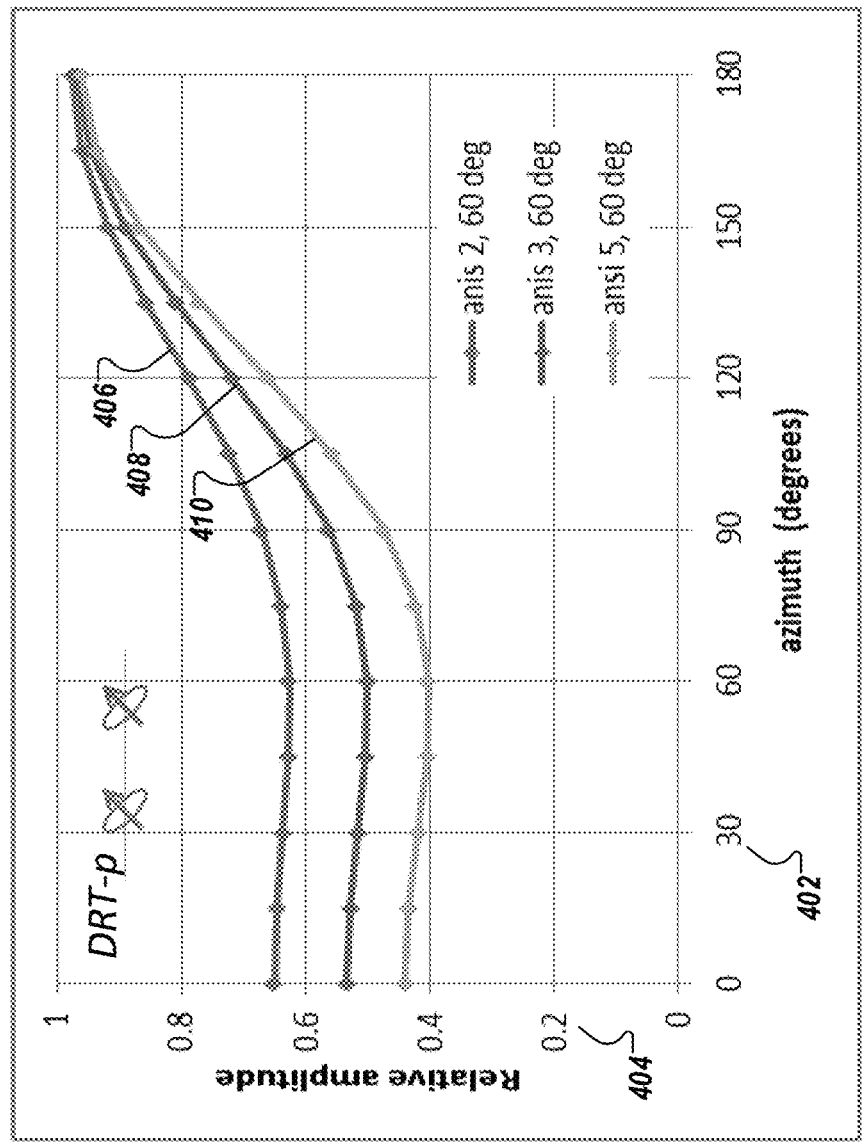
FIG. 4 shows relative amplitudes of late time DRT-p transient responses for a dip angle of 60° and different resistivity anisotropies, according to an implementation.
Figure 5:
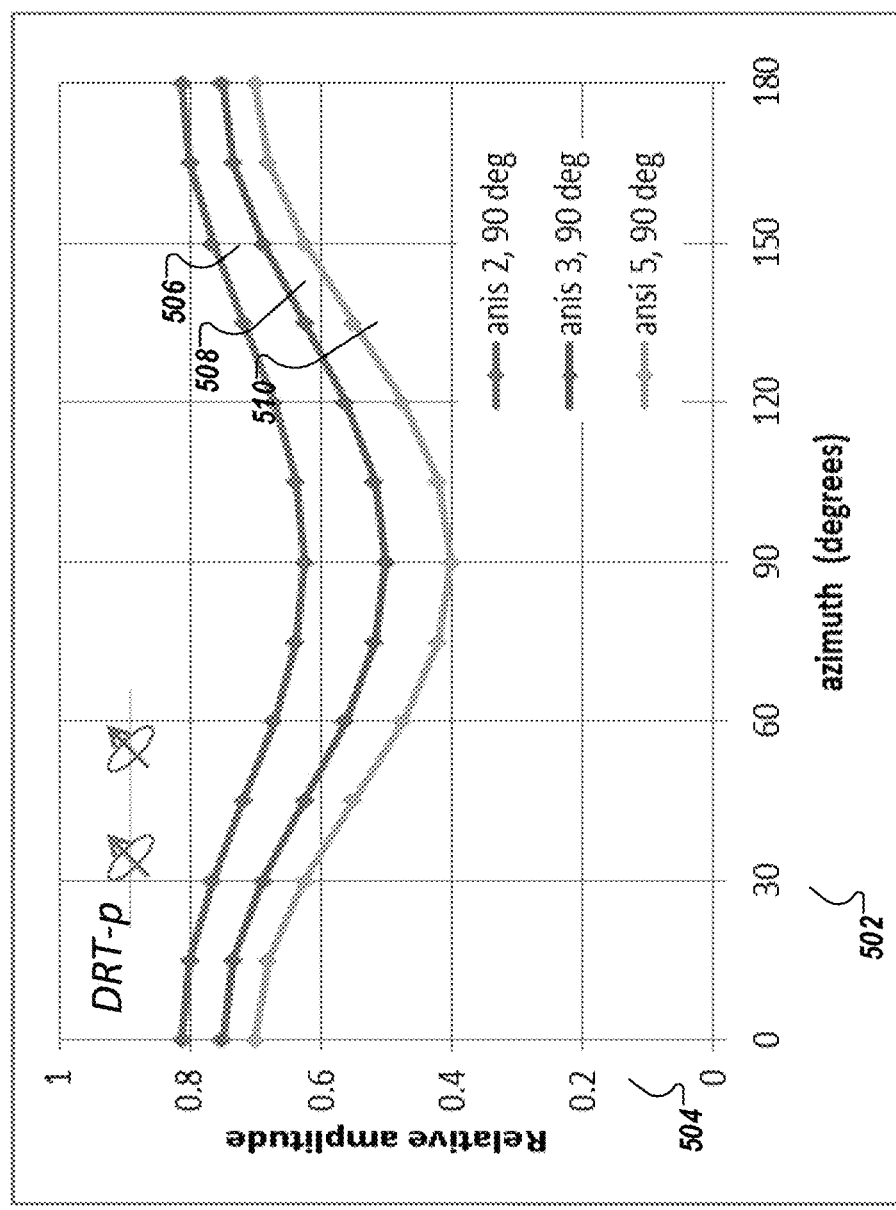
FIG. 5 shows relative amplitudes of late time DRT-p transient responses for a dip angle of 90° and different resistivity anisotropies, according to an implementation.
Figure 6:
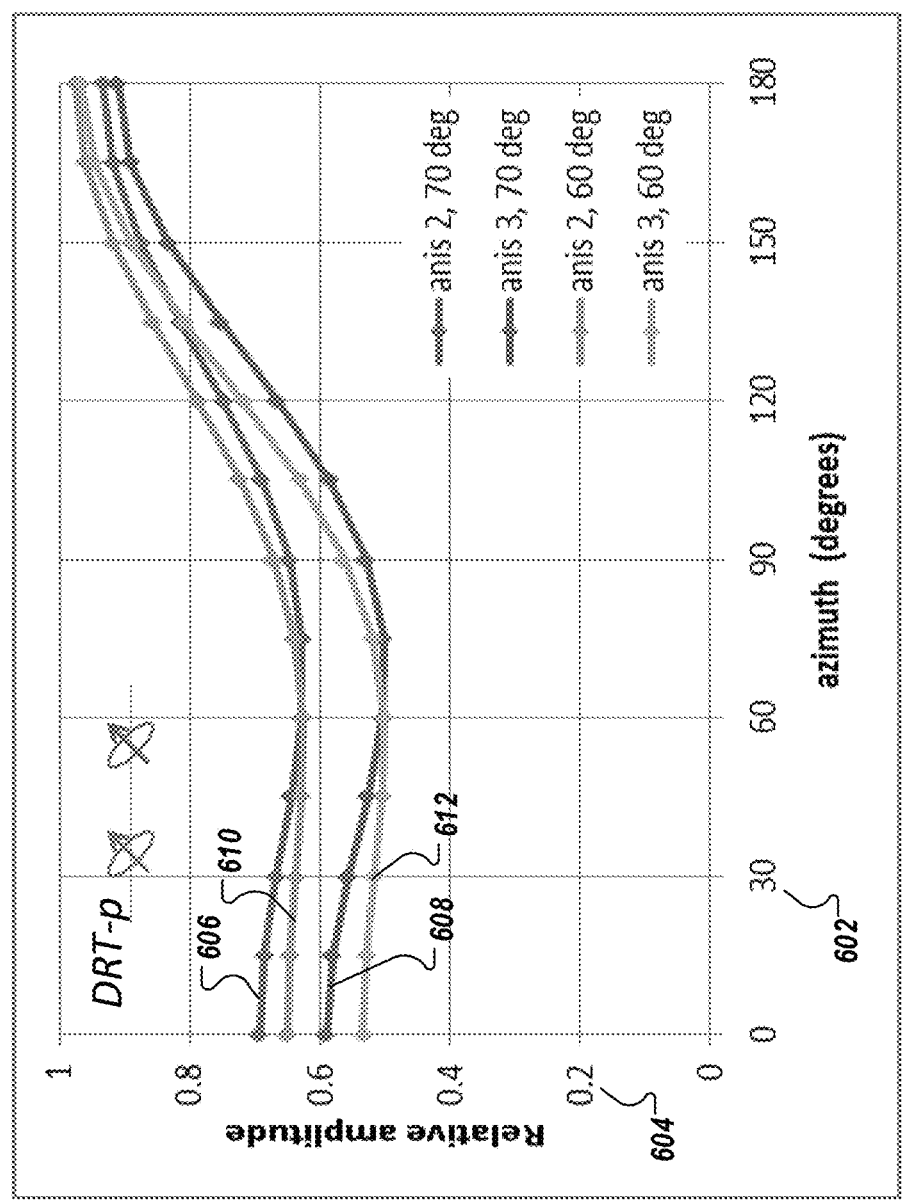
FIG. 6 relative amplitudes of late time DRT-p transient responses for dip angles 60° and 70°, according to an implementation.

FIGS. 4-6 illustrate relative amplitudes of late time transient responses of a DRT-p in a homogeneous anisotropic formation, where the DRT-p transmitter and receiver dipoles are tilted by 45°, that is, $\xi=45°$. The resistivity anisotropy $R_V/R_H (=1/\alpha^2)$ is varied from 1 (isotropic) to 2, 3, and 5. The horizontal resistivity is varied from 0.1 Ohm-m to 100 Ohm-m. The dip angle $\theta$ is assumed as 0° (vertical well), 60°, 70°, or 90° (horizontal well). Based on the DRT-p transient response in equation (13), it can be shown that as t increases, $$u^2 = \frac{\mu_0\sigma_H}{4t}L^2 \to 0,$$

and the relative amplitude of the late time DRT-p transient response can be given by $$\frac{(\mu_0\sigma_H)^{\frac{3}{2}}}{8t^{\frac{5}{2}}}e^{-u^2}\left\{1 + \frac{3}{8}(\alpha^2-1)(\sin^2\theta\sin^2\eta + 2\sin\theta\cos\theta\cos\eta + 1)\right\}, \quad (17)$$

where the relative amplitude is the late time amplitude of equation (13) normalized to the constant C. In some implementations, the relative amplitude of the late time DRT-p transient response is given by $$1 + \frac{3}{8}(\alpha^2-1)(\sin^2\theta\sin^2\eta + 2\sin\theta\cos\theta\cos\eta + 1), \quad (18)$$

where the relative amplitude is the late time amplitude of equation (13) normalized to the term $$C\frac{(\mu_0\sigma_H)^{\frac{3}{2}}}{8t^{\frac{5}{2}}}e^{-u^2}.$$

FIG. 4 shows relative amplitudes of late time DRT-p transient responses 400 for a dip angle of 60° and different resistivity anisotropies, according to an implementation. The transient responses 400 illustrate variations of relative amplitudes 404 of late time transient responses with respect to azimuth angles 402 based on equation (18), including late time transient responses 406, 408, and 410 for resistivity anisotropies of 2, 3, and 5, respectively, at dip angle of 60°. It can be observed that the amplitude variation with respect to the azimuth change increases as the resistivity anisotropy increases. For example, the amplitude variation in the transient response 410 is larger than that in the transient response 406.

FIG. 5 shows relative amplitudes of late time DRT-p transient responses 500 for a dip angle of 90° and different resistivity anisotropies, according to an implementation. The transient responses 500 illustrate variations of relative amplitudes 504 of late time transient responses with respect to azimuth angles 502 based on equation (18), including late time transient responses 506, 508, and 510 with resistivity anisotropies of 2, 3, and 5, respectively, at dip angle of 90°. It can be observed that when the dip angle is 90°, the amplitude responses 506, 508, and 510 are symmetric with respect to azimuth angle 90°.

FIG. 6 shows relative amplitudes of late time DRT-p transient responses 600 for dip angles 60° and 70°, according to an implementation. The transient responses 600 illustrate variations of relative amplitudes 604 of late time transient responses with respect to azimuth angles 602 based on equation (18), including late time transient responses 606 and 608 with resistivity anisotropies of 2 and 3, respectively, at dip angle 70°, and late time transient responses 610 and 612 with resistivity anisotropies of 2 and 3, respectively, at dip angle of 60°. It can be observed that the amplitude variation with the azimuth change depends more strongly on the resistivity anisotropy. In other words, the resistivity anisotropy has more impact on the amplitude variation than the dip angle does. In addition, for a given resistivity anisotropy, the amplitude variation increases as the dip angle increases.

Figure 7:
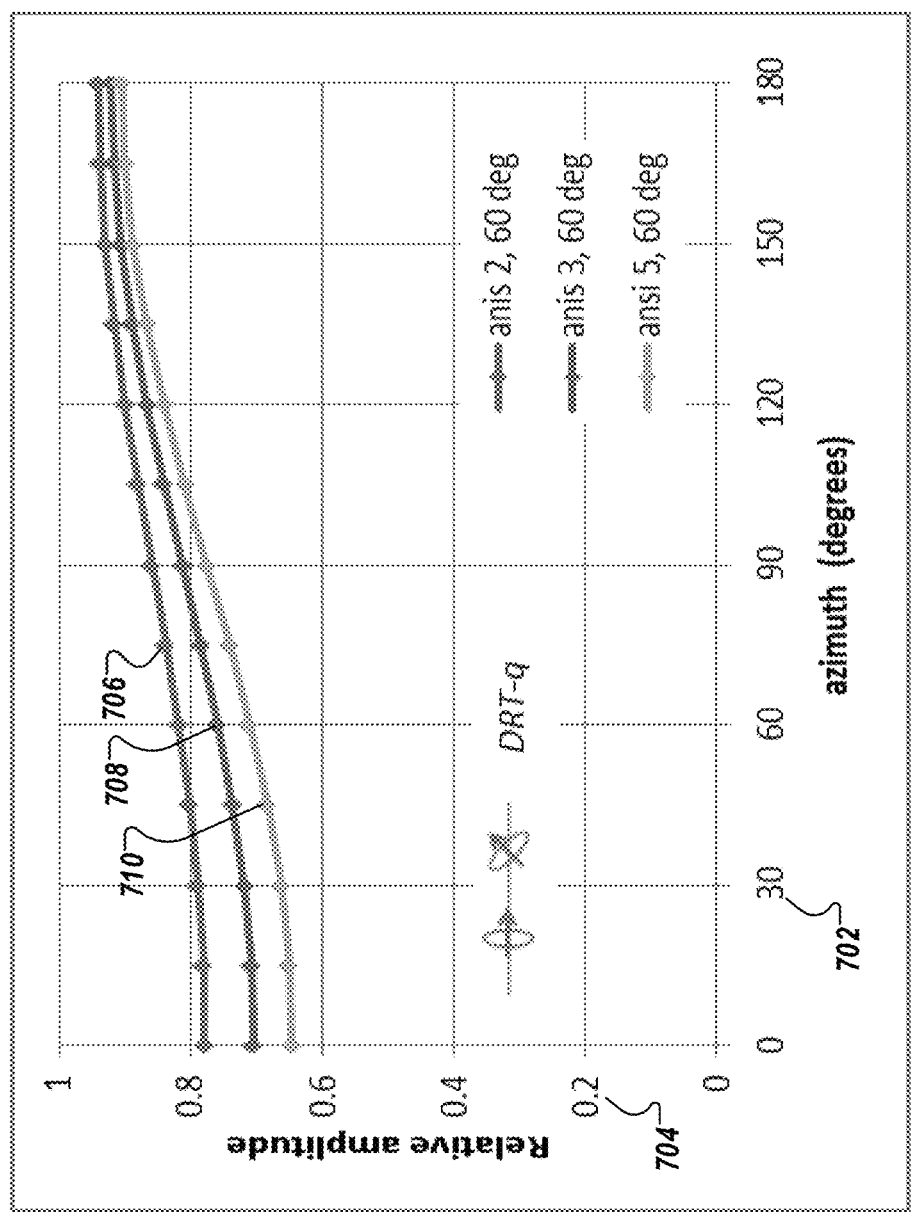
FIG. 7 shows relative amplitudes of late time DRT-q transient responses for a dip angle of 60° and different resistivity anisotropies, according to an implementation.
Figure 8:
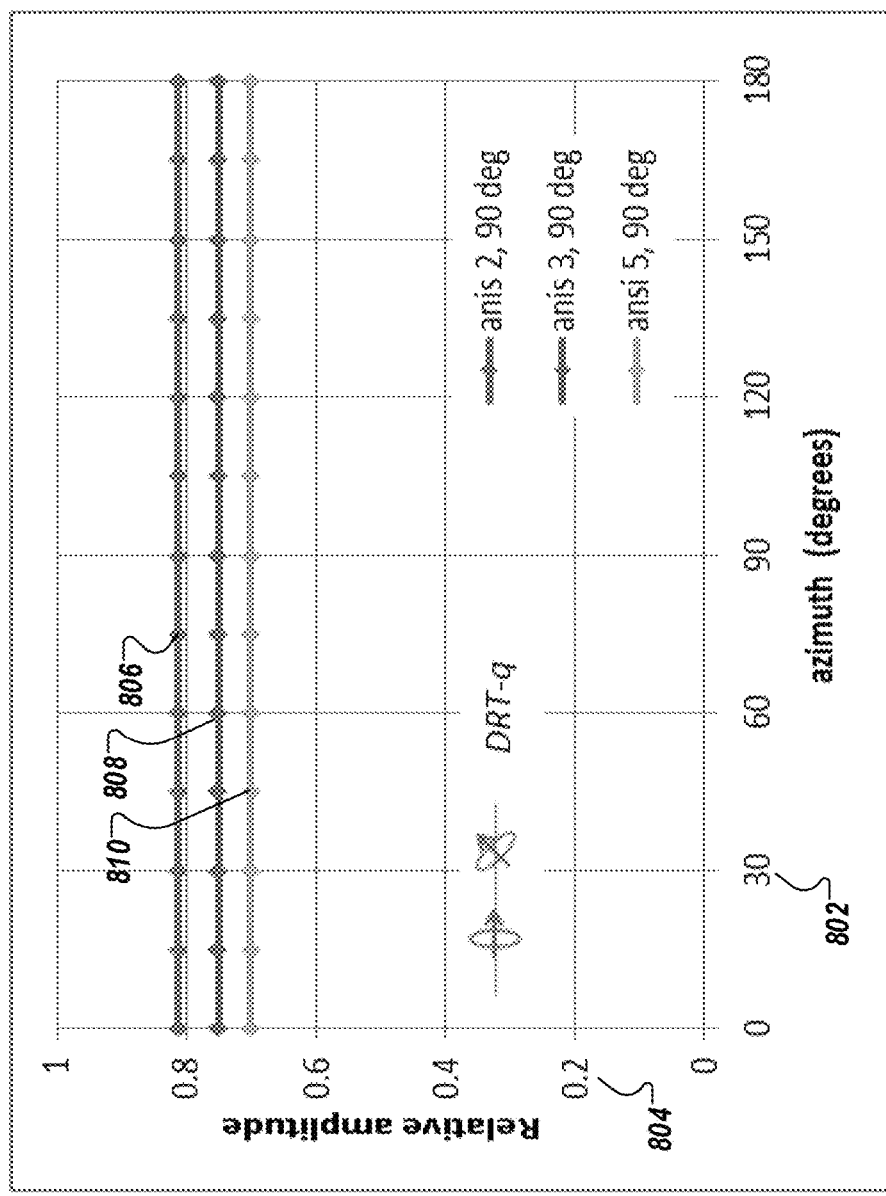
FIG. 8 shows relative amplitudes of late time DRT-q transient responses for a dip angle of 90° and different resistivity anisotropies, according to an implementation.
Figure 9:
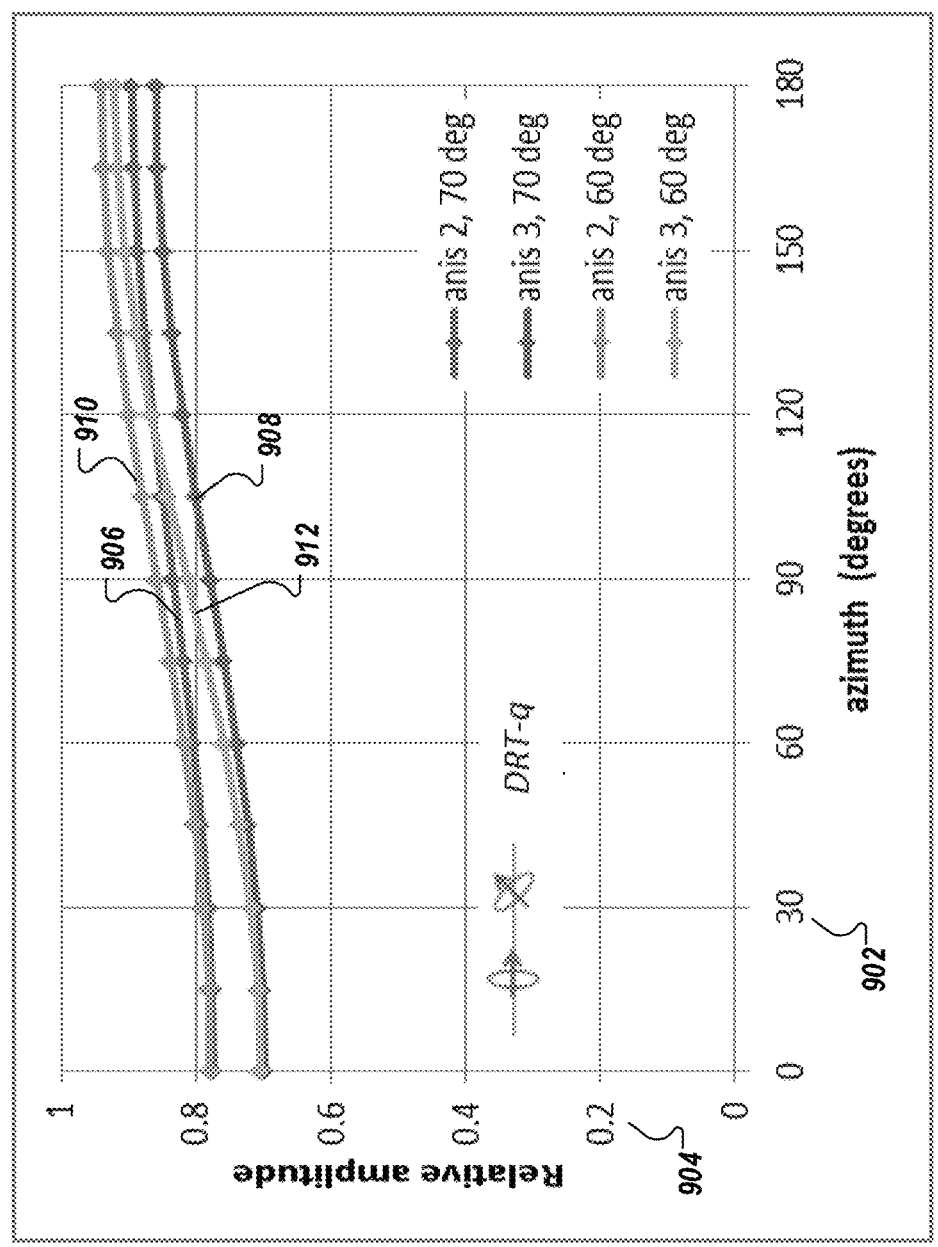
FIG. 9 shows relative amplitudes of late time DRT-q transient responses for dip angles 60° and 70°, according to an implementation.

FIGS. 7-9 illustrate relative amplitudes of late time transient responses of a DRT-q in a homogeneous anisotropic formation where the DRT-q transmitter dipole is tilted by 45°, that is, $\xi=45°$. Based on the DRT-q transient response in equation (14), the relative amplitude of the late time DRT-q transient response is given by $$\frac{(\mu_0\sigma_H)^{\frac{3}{2}}}{8t^{\frac{5}{2}}}e^{-u^2}\left\{1 + \frac{3}{2}(\alpha^2-1)\sin\theta(\sin\theta + \cos\theta\cos\eta)\right\}, \quad (19)$$

where the relative amplitude is the late time amplitude of equation (14) normalized to the constant C. In some implementations, the relative amplitude of the late time DRT-q transient response is given by $$1 + \frac{3}{2}(\alpha^2-1)\sin\theta(\sin\theta + \cos\theta\cos\eta), \quad (20)$$

where the relative amplitude is the late time amplitude of equation (14) normalized to the term $$C\frac{(\mu_0\sigma_H)^{\frac{3}{2}}}{8t^{\frac{5}{2}}}e^{-u^2}.$$

FIG. 7 shows relative amplitudes of late time DRT-q transient responses 700 for a dip angle of 60° and different resistivity anisotropies, according to an implementation. The transient responses 700 illustrate variations of relative amplitudes 704 of late time transient responses with respect to azimuth angles 702 based on equation (20), including late time transient responses 706, 708, and 710 for resistivity anisotropies of 2, 3, and 5, respectively, at dip angle of 60°. FIG. 8 shows relative amplitudes of late time DRT-q transient responses 800 for a dip angle of 90° and different resistivity anisotropies, according to an implementation. The transient responses 800 illustrate variations of relative amplitudes 804 of late time transient responses with respect to azimuth angles 802 based on equation (20), including late time transient responses 806, 808, and 810 with resistivity anisotropies of 2, 3, and 5, respectively, at dip angle of 90°. FIG. 9 shows relative amplitudes of late time DRT-q transient responses 900 for dip angles 60° and 70°, according to an implementation. The transient responses 900 illustrate variations of relative amplitudes 904 of late time transient responses with respect to azimuth angles 902 based on equation (20), including late time transient responses 906 and 908 with resistivity anisotropies of 2 and 3, respectively, at dip angle 70°, and late time transient responses 910 and 912 with resistivity anisotropies of 2 and 3, respectively, at dip angle of 60°. Comparing FIGS. 4-6 and FIGS. 7-9, it can be observed that the amplitude variation with respect to the azimuth change is more prominent for DRT-p than for DRT-q.

Figure 10:
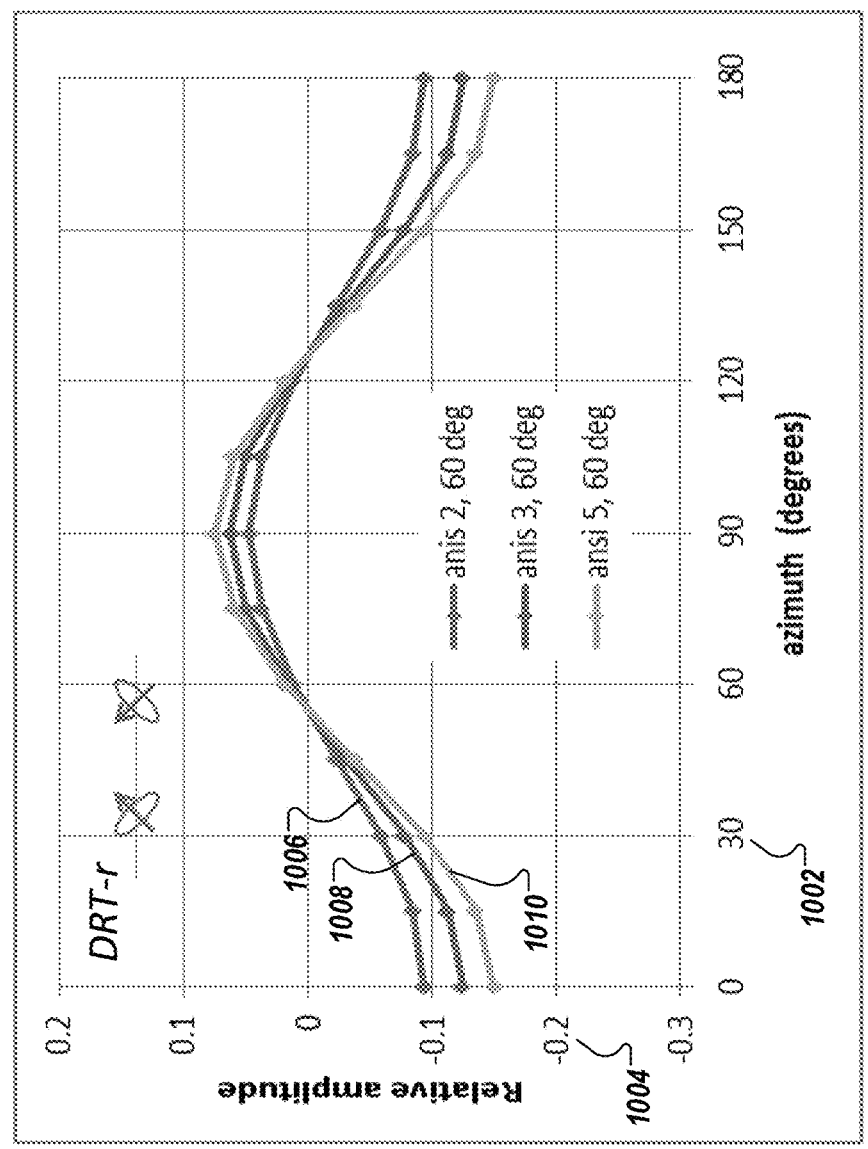
FIG. 10 shows relative amplitudes of late time DRT-r transient responses for a dip angle of 60° and different resistivity anisotropies, according to an implementation.
Figure 11:
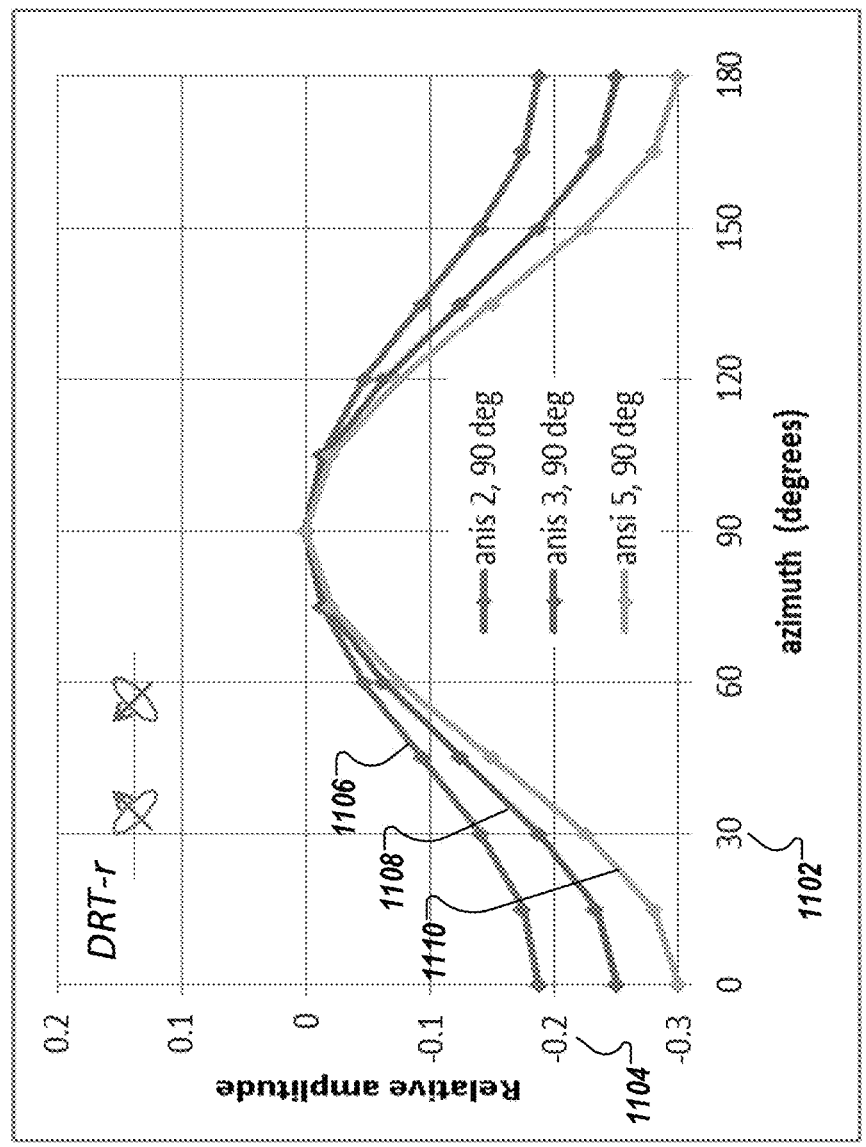
FIG. 11 shows relative amplitudes of late time DRT-r transient responses for a dip angle of 90° and different resistivity anisotropies, according to an implementation.
Figure 12:
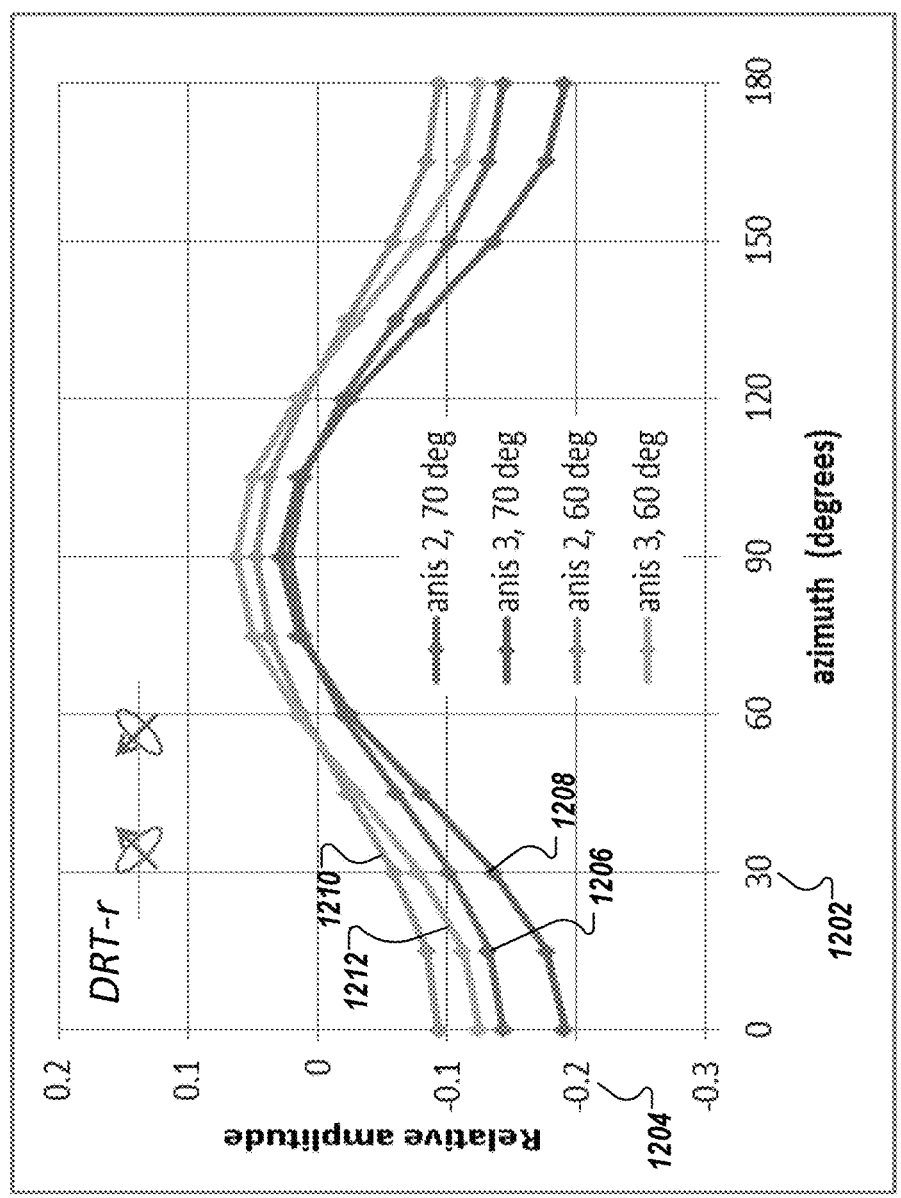
FIG. 12 shows relative amplitudes of late time DRT-r transient responses for dip angles 60° and 70°, according to an implementation.

FIGS. 10-12 illustrate relative amplitudes of late time transient responses of a DRT-r in a homogeneous anisotropic formation, where the DRT-r transmitter and receiver dipoles are tilted by 45° in different directions, that is, $\xi=45°$. Based on the DRT-r transient response in equation (15), the relative amplitude of the late time DRT-r transient response is given by $$\frac{(\mu_0\sigma_H)^{\frac{3}{2}}}{8t^{\frac{5}{2}}}e^{-u^2}(\alpha^2-1)(\cos 2\theta + \sin^2\theta \sin^2\eta), \quad (21)$$

where the relative amplitude is the late time amplitude of equation (15) normalized to the constant C. In some implementations, the relative amplitude of the late time DRT-r transient response is given by $$(\alpha^2-1)(\cos 2\theta + \sin^2\theta \sin^2\eta) \quad (22),$$

where the relative amplitude is the late time amplitude of equation (15) normalized to the term $$C\frac{(\mu_0\sigma_H)^{\frac{3}{2}}}{8t^{\frac{5}{2}}}e^{-u^2}.$$

FIG. 10 shows relative amplitudes of late time DRT-r transient responses 1000 for a dip angle of 60° and different resistivity anisotropies, according to an implementation. The transient responses 1000 illustrate variations of relative amplitudes 1004 of late time transient responses with respect to azimuth angles 1002 based on equation (22), including late time transient responses 1006, 1008, and 1010 for resistivity anisotropies of 2, 3, and 5, respectively, at dip angle of 60°. FIG. 11 shows relative amplitudes of late time DRT-r transient responses 1100 for a dip angle of 90° and different resistivity anisotropies, according to an implementation. The transient responses 1100 illustrate variations of relative amplitudes 1104 of late time transient responses with respect to azimuth angles 1102 based on equation (22), including late time transient responses 1106, 1108, and 1110 with resistivity anisotropies of 2, 3, and 5, respectively, at dip angle of 90°. FIG. 12 shows relative amplitudes of late time DRT-r transient responses 1200 for dip angles 60° and 70°, according to an implementation. The transient responses 1200 illustrate variations of relative amplitudes 1204 of late time transient responses with respect to azimuth angles 1202 based on equation (22), including late time transient responses 1206 and 1208 with resistivity anisotropies of 2 and 3, respectively, at dip angle 70°, and late time transient responses 1210 and 1212 with resistivity anisotropies of 2 and 3, respectively, at dip angle of 60°. Comparing FIGS. 4-9 and FIGS. 10-12, it can be observed that the amplitude variation with respect to the azimuth change is more prominent for DRT-p and DRT-q than for DRT-r. In addition, the resistivity anisotropy $\alpha^2$ and the horizontal conductivity $\sigma_H$ may not be determined separately by DRT-r as these two appear as a product $$\frac{(\mu_0\sigma_H)^{\frac{3}{2}}}{8t^{\frac{5}{2}}}(\alpha^2-1)$$

in the late time DRT-r transient response as shown in equation (21).

From FIGS. 4-12 it is clear that, for different dip angles and anisotropies, the relative amplitude responses with respect to azimuth variation are different. Therefore, by measuring the relative amplitude of the late time transient response at different azimuth angles, resistivity anisotropy and dip angle can be determined, for example, by non-linear regression techniques, parameter fitting techniques, or other techniques. In some implementations, horizontal resistivity can also be determined. For example, the horizontal resistivity, the anisotropy, and the dip, can be determined by minimizing the following cost function:

$$S = \sum_\eta |V_\xi(\sigma_H, \alpha, \theta; \eta; t \to \text{large}) - M_\xi(\eta; t \to \text{large})|^2, \quad (23)$$

where $V_\xi(\sigma_H,\alpha,\theta;\eta;t\to\text{large})$ is the theoretical late time DRT transient response (for example, based on equation (17), (19) or (21)) with an antenna dipole tilt angle $\xi$ in an anisotropic formation with a horizontal conductivity $\sigma_H$, conductivity anisotropy $\alpha^2$, and dip angle $\theta$ at a tool azimuth angle $\eta$, and $M_\xi(\eta;t\to\text{large})$ is the measured late time response at the tool azimuth angle $\eta$. In some implementations, $V_\xi(\sigma_H,\alpha,\theta;\eta;t\to\text{large})$ can be calculated at a certain large t value and $M_\xi(\eta;t\to\text{large})$ can be measured at a time instance corresponding to the same t value. The anisotropy, horizontal conductivity, and dip angle can be determined as the set of parameters that minimizes a difference between a theoretical late time response and the measured response, over a range of azimuth angle (for example, a range from 0° to 180°). In some implementations, the theoretical late time transient responses for different dip angles, horizontal conductivities, and anisotropies can be pre-calculated over a range of azimuth angle. The measured response can be compared with each of the pre-calculated responses by computing an error $$\sum_\eta |V_\xi(\sigma_H, \alpha, \theta; \eta; t \to \text{large}) - M_\xi(\eta; t \to \text{large})|^2$$

that is summed over a range of azimuth angle $\eta$. The theoretical response that best matches the measured response, for example, with a smallest error, can be identified. The anisotropy, horizontal conductivity, and dip angle can be determined as the anisotropy, horizontal conductivity, and dip angle associated with the theoretical response that best matches the measured response.

Figure 13:
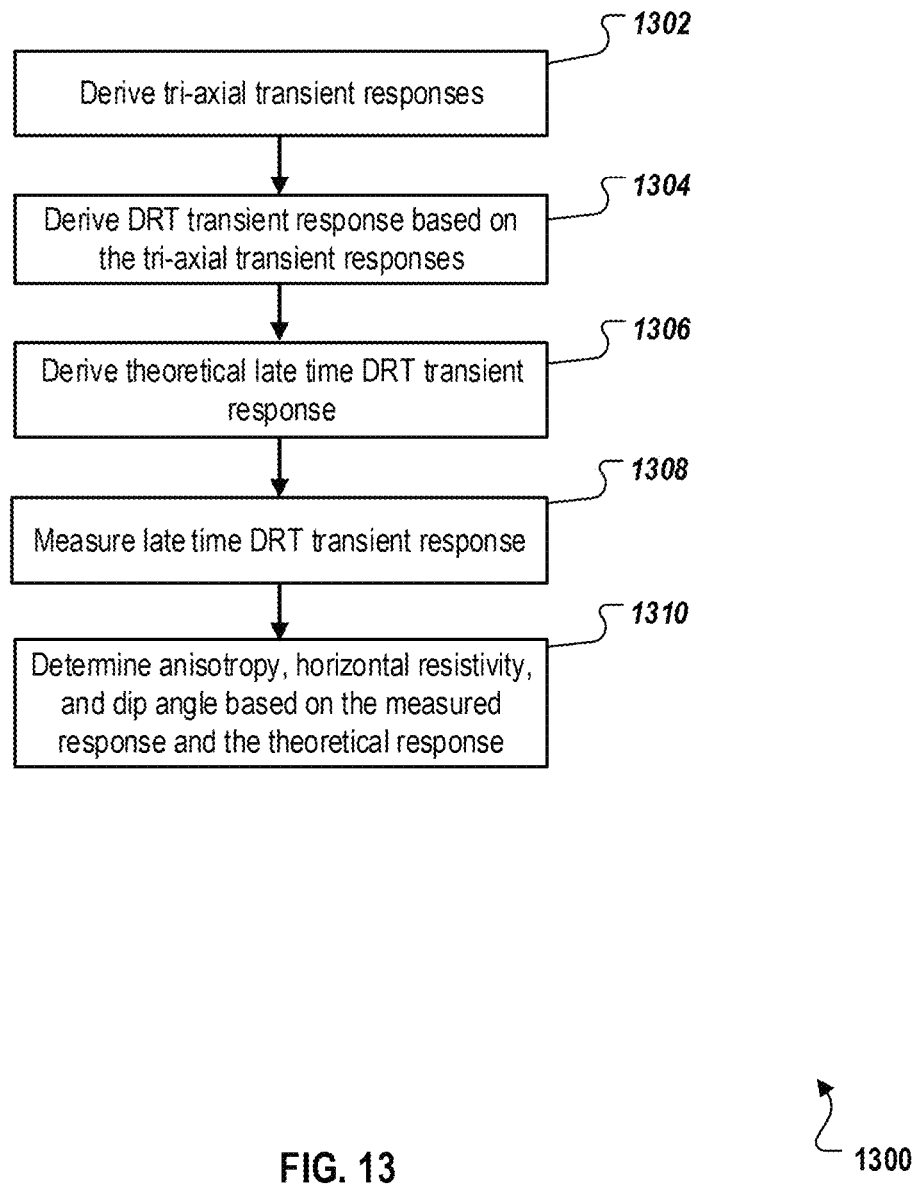
FIG. 13 is a flow chart of an example method for using a DRT to determine an anisotropy and dip angle, according to an implementation.

FIG. 13 is a flow chart of an example method 1300 for using a DRT to determine an anisotropy and dip angle, according to an implementation. For clarity of presentation, the description that follows generally describes method 1300 in the context of the other figures in this description. However, it will be understood that method 1300 may be performed, for example, by any suitable system, environment, software, and hardware, or a combination of systems, environments, software, and hardware as appropriate. In some implementations, various steps of method 1300 can be run in parallel, in combination, in loops, or in any order.

At 1302, transient responses of a tri-axial resistivity tool are derived, where the tri-axial resistivity tool has three mutually orthogonal transmitters and three mutually orthogonal receivers, and one of the transmitters and one of the receivers are aligned with the borehole axis. For example, the coaxial, coplanar, and cross-component transient responses of the tri-axial resistivity tool can be derived as in equations (1)-(5). From 1302, method 1300 proceeds to 1304.

At 1304, a transient response of a DRT tool is derived based on the tri-axial transient responses at 1302, where the transmitter and receiver of the DRT are co-located with the transmitters and receivers of the tri-axial resistivity tool, respectively, and at least one of the DRT transmitter or receiver dipole is titled from the borehole axis. For example, the transient responses of DRT-p, DRT-q, and DRT-r can be derived as in equations (13)-(15) based on the tri-axial transient responses in equations (1)-(5). From 1304, method 1300 proceeds to 1306.

At 1306, a theoretical late time DRT transient response is derived by having time t approaching to a large value in the transient response at 1304. For example, the relative amplitudes of the late time transient responses are shown in equations (17)-(22) for DRT-p, DRT-q, and DRT-r. From 1306, method 1300 proceeds to 1308.

At 1308, the late time DRT transient response with respect to tool azimuth variation can be measured. The late time transient response with tool azimuth variation can be measured by rotating the DRT in the borehole, for example, during drilling. In some implementations, the theoretical late time transient responses at 1306 (for example, equations (17), (19) or (21)) can be evaluated at a certain large t value, and the measured late time transient response can be measured at a time instance corresponding to the t value used at 1306. From 1308, method 1300 proceeds to 1310.

At 1310, an anisotropy, horizontal conductivity, and dip angle can be determined based on the measured late time transient response at 1308 and the theoretical late time transient response at 1306 by, for example, parameter fitting techniques, regression analysis, minimization process, Monte Carlo minimization process, inversion process, or other techniques or processes. For example, the anisotropy, horizontal conductivity and dip angle can be determined by minimizing a difference between the measured response and a theoretical response over a range of tool azimuth angle, such as minimizing the cost function in equation (23).

In some implementations, theoretical late time transient responses can be pre-calculated for different anisotropies, horizontal conductivities, and dip angles. For example, based on one of equations (17), (19) and (21) depending on the DRT configuration, theoretical late time transient responses can be calculated for a first set of parameters of dip angle $\theta_1$, horizontal conductivity $\sigma_{H1}$, and anisotropies $\alpha^2_1$ at different azimuth angles $\eta_1$ and $\eta_2$, denoted as $V_\xi(\sigma_{H1},\alpha_1,\theta_1;\eta_1;t\to\text{large})$ and $V_\xi(\sigma_{H1},\alpha_1,\theta_1;\eta_2;t\to\text{large})$, respectively. Similarly, theoretical late time transient responses can also be calculated for a second set of parameter of dip angle $\theta_2$, horizontal conductivity $\sigma_{H2}$, and anisotropies $\alpha^2_2$ at azimuth angles $\eta_1$ and $\eta_2$, denoted as $V_\xi(\sigma_{H2},\alpha_2,\theta_2;\eta_1;t\to\text{large})$ and $V_\xi(\sigma_{H2},\alpha_2,\theta_2;\eta_2;t\to\text{large})$, respectively. The actual late time responses measured at azimuth angles $\eta_1$ and $\eta_2$ are denoted as $M_\xi(\eta_1;t\to\text{large})$ and $M_\xi(\eta_2;t\to\text{large})$, respectively. The measured responses can be compared to the pre-calculated theoretical responses to determine whether the measured responses are closer to the responses associated with the first set of parameter or the second set of parameters. For example, errors between the theoretical responses and the measured responses can be computed for the first set of parameters and the second set of parameters, respectively, as $$\text{Error}_1 = |V_\xi(\sigma_{H1},\alpha_1,\theta_1;\eta_1;t\to\text{large}) - M_\xi(\eta_1; t\to\text{large})|^2 + |V_\xi(\sigma_{H1},\alpha_1,\theta_1;\eta_1;t\to\text{large}) - M_\xi(\eta_2; t\to\text{large})|^2$$

and $$\text{Error}_2 = |V_\xi(\sigma_{H2},\alpha_2,\theta_2;\eta_1;t\to\text{large}) - M_\xi(\eta_1; t\to\text{large})|^2 + |V_\xi(\sigma_{H2},\alpha_2,\theta_2;\eta_2;t\to\text{large}) - M_\xi(\eta_2; t\to\text{large})|^2.$$

If $\text{Error}_1$ is smaller than $\text{Error}_2$, the anisotropy, horizontal conductivity, and dip angle are determined as the first set of parameters, that is, dip angle $\theta_1$, horizontal conductivity $\sigma_{H1}$, and anisotropies $\alpha^2_1$. Otherwise, the anisotropy, horizontal conductivity, and dip angle are determined as the second set of parameters, that is, dip angle $\theta_2$, horizontal conductivity $\sigma_{H2}$, and anisotropies $\alpha^2_2$. From 1310, method 1300 stops.

Figure 14:
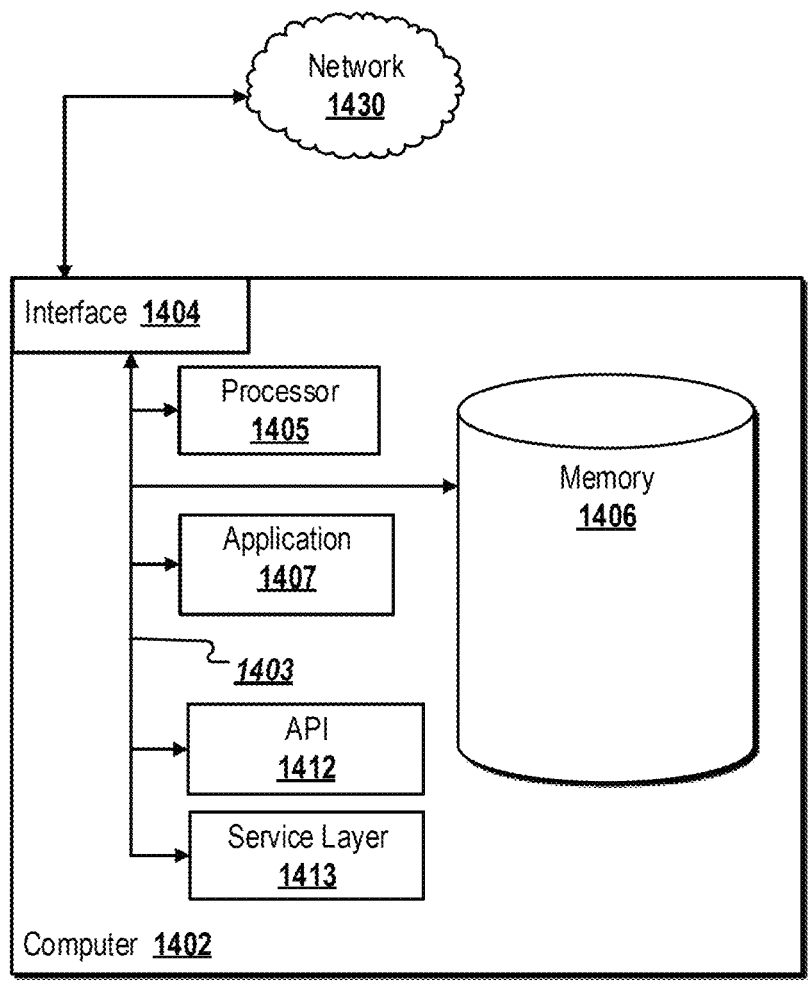
FIG. 14 is a block diagram of an exemplary computer system used to provide computational functionalities associated with described algorithms, methods, functions, processes, flows, and procedures as described in the instant disclosure, according to an implementation.

FIG. 14 is a block diagram of an exemplary computer system 1400 used to provide computational functionalities associated with described algorithms, methods, functions, processes, flows, and procedures as described in the instant disclosure, according to an implementation. The illustrated computer 1402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1402 may comprise a computer that includes an input device, such as a keypad, keyboard, touch screen, or other device that can accept user information, and an output device that conveys information associated with the operation of the computer 1402, including digital data, visual, or audio information (or a combination of information), or a GUI.

The computer 1402 can serve in a role as a client, network component, a server, a database or other persistency, or any other component (or a combination of roles) of a computer system for performing the subject matter described in the instant disclosure. The illustrated computer 1402 is communicably coupled with a network 1430. In some implementations, one or more components of the computer 1402 may be configured to operate within environments, including cloud-computing-based, local, global, or other environment (or a combination of environments).

At a high level, the computer 1402 is an electronic computing device operable to receive, transmit, process, store, or manage data and information associated with the described subject matter. According to some implementations, the computer 1402 may also include or be communicably coupled with an application server, e-mail server, web server, caching server, streaming data server, business intelligence (BI) server, or other server (or a combination of servers).

The computer 1402 can receive requests over network 1430 from a client application (for example, executing on another computer 1402) and responding to the received requests by processing the said requests in an appropriate software application. In addition, requests may also be sent to the computer 1402 from internal users (for example, from a command console or by other appropriate access method), external or third-parties, other automated applications, as well as any other appropriate entities, individuals, systems, or computers.

Each of the components of the computer 1402 can communicate using a system bus 1403. In some implementations, any or all of the components of the computer 1402, both hardware or software (or a combination of hardware and software), may interface with each other or the interface 1404 (or a combination of both) over the system bus 1403 using an application programming interface (API) 1412 or a service layer 1413 (or a combination of the API 1412 and service layer 1413). The API 1412 may include specifications for routines, data structures, and object classes. The API 1412 may be either computer-language independent or dependent and refer to a complete interface, a single function, or even a set of APIs. The service layer 1413 provides software services to the computer 1402 or other components (whether or not illustrated) that are communicably coupled to the computer 1402. The functionality of the computer 1402 may be accessible for all service consumers using this service layer. Software services, such as those provided by the service layer 1413, provide reusable, defined business functionalities through a defined interface. For example, the interface may be software written in JAVA, C++, or other suitable language providing data in extensible markup language (XML) format or other suitable format. While illustrated as an integrated component of the computer 1402, alternative implementations may illustrate the API 1412 or the service layer 1413 as stand-alone components in relation to other components of the computer 1402 or other components (whether or not illustrated) that are communicably coupled to the computer 1402. Moreover, any or all parts of the API 1412 or the service layer 1413 may be implemented as child or sub-modules of another software module, enterprise application, or hardware module without departing from the scope of this disclosure.

The computer 1402 includes an interface 1404. Although illustrated as a single interface 1404 in FIG. 14, two or more interfaces 1404 may be used according to particular needs, desires, or particular implementations of the computer 1402. The interface 1404 is used by the computer 1402 for communicating with other systems in a distributed environment that are connected to the network 1430 (whether illustrated or not). Generally, the interface 1404 comprises logic encoded in software or hardware (or a combination of software and hardware) and operable to communicate with the network 1430. More specifically, the interface 1404 may comprise software supporting one or more communication protocols associated with communications such that the network 1430 or interface's hardware is operable to communicate physical signals within and outside of the illustrated computer 1402.

The computer 1402 includes a processor 1405. Although illustrated as a single processor 1405 in FIG. 14, two or more processors may be used according to particular needs, desires, or particular implementations of the computer 1402. Generally, the processor 1405 executes instructions and manipulates data to perform the operations of the computer 1402 and any algorithms, methods, functions, processes, flows, and procedures as described in the instant disclosure.

The computer 1402 also includes a memory 1406 that holds data for the computer 1402 or other components (or a combination of both) that can be connected to the network 1430 (whether illustrated or not). For example, memory 1406 can be a database storing data consistent with this disclosure. Although illustrated as a single memory 1406 in FIG. 14, two or more memories may be used according to particular needs, desires, or particular implementations of the computer 1402 and the described functionality. While memory 1406 is illustrated as an integral component of the computer 1402, in alternative implementations, memory 1406 can be external to the computer 1402.

The application 1407 is an algorithmic software engine providing functionality according to particular needs, desires, or particular implementations of the computer 1402, particularly with respect to functionality described in this disclosure. For example, application 1407 can serve as one or more components, modules, applications, etc. Further, although illustrated as a single application 1407, the application 1407 may be implemented as multiple applications 1407 on the computer 1402. In addition, although illustrated as integral to the computer 1402, in alternative implementations, the application 1407 can be external to the computer 1402.

There may be any number of computers 1402 associated with, or external to, a computer system containing computer 1402, each computer 1402 communicating over network 1430. Further, the term "client," "user," and other appropriate terminology may be used interchangeably as appropriate without departing from the scope of this disclosure. Moreover, this disclosure contemplates that many users may use one computer 1402, or that one user may use multiple computers 1402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    deriving transient responses of a tri-axial resistivity tool corresponding to an electromagnetic (EM) impulse;
    deriving a transient response of a directional resistivity tool (DRT) corresponding to the EM impulse based on the transient responses of the tri-axial resistivity tool;
    deriving a theoretical late time transient response of the DRT based on the transient response of the DRT;
    measuring the late time transient response of the DRT; and
    determining an anisotropy, a horizontal conductivity, and a dip angle based on the measured late time transient response and the theoretical late time transient response, including:
    determining, using a first combination of values of the anisotropy, the horizontal conductivity, and the dip angle, a first error between the measured late time transient response and the theoretical late time transient response;
    determining, using a second combination of values of the anisotropy, the horizontal conductivity, and the dip angle, a second error between the measured late time transient response and the theoretical late time transient response; and
    determining the anisotropy, the horizontal conductivity and the dip angle from either the first combination of values or the second combination of values responsive to a comparison of the first error and the second error.

2. The method of claim 1, wherein the DRT includes one transmitter and one receiver, at least one of a dipole of the transmitter or a dipole of the receiver tilted from a tool axis.

3. The method of claim 2, wherein the tri-axial resistivity tool includes three mutually orthogonal transmitters and three mutually orthogonal receivers, the transmitters and the receivers of the tri-axial resistivity tool co-located with the transmitter and the receiver of the DRT, respectively.

4. The method of claim 1, wherein deriving the theoretical late time transient response includes having a time in the transient response approach to a large value.

5. The method of claim 1, wherein measuring the late time transient response includes measuring the late time transient response at different azimuth angles.

6. The method of claim 1, wherein determining the anisotropy, the horizontal conductivity, and the dip angle includes choosing the anisotropy, the horizontal conductivity, and the dip angle such that a difference between the measured late time transient response and the theoretical late time transient response is minimized.

7. The method of claim 1, wherein the anisotropy is at least one of a resistivity anisotropy or a conductivity anisotropy.

8. A non-transitory, computer-readable medium storing one or more instructions executable by a computer system to perform operations comprising:
deriving transient responses of a tri-axial resistivity tool corresponding to an electromagnetic (EM) impulse;
deriving a transient response of a directional resistivity tool (DRT) corresponding to the EM impulse based on the transient responses of the tri-axial resistivity tool;
deriving a theoretical late time transient response of the DRT based on the transient response of the DRT;
measuring the late time transient response of the DRT; and
determining an anisotropy, a horizontal conductivity, and a dip angle based on the measured late time transient response and the theoretical late time transient response, including:
determining, using a first combination of values of the anisotropy, the horizontal conductivity, and the dip angle, a first error between the measured late time transient response and the theoretical late time transient response;
determining, using a second combination of values of the anisotropy, the horizontal conductivity, and the dip angle, a second error between the measured late time transient response and the theoretical late time transient response; and
determining the anisotropy, the horizontal conductivity and the dip angle from either the first combination of values or the second combination of values responsive to a comparison of the first error and the second error.

9. The non-transitory, computer-readable medium of claim 8, wherein the DRT includes one transmitter and one receiver, at least one of a dipole of the transmitter or a dipole of the receiver tilted from a tool axis.

10. The non-transitory, computer-readable medium of claim 9, wherein the tri-axial resistivity tool includes three mutually orthogonal transmitters and three mutually orthogonal receivers, the transmitters and the receivers of the tri-axial resistivity tool co-located with the transmitter and the receiver of the DRT, respectively.

11. The non-transitory, computer-readable medium of claim 8, wherein deriving the theoretical late time transient response includes having a time in the transient response approach to a large value.

12. The non-transitory, computer-readable medium of claim 8, wherein measuring the late time transient response includes measuring the late time transient response at different azimuth angles.

13. The non-transitory, computer-readable medium of claim 8, wherein determining the anisotropy, the horizontal conductivity, and the dip angle includes choosing the anisotropy, the horizontal conductivity, and the dip angle such that a difference between the measured late time transient response and the theoretical late time transient response is minimized.

14. The non-transitory, computer-readable medium of claim 8, wherein the anisotropy is at least one of a resistivity anisotropy or a conductivity anisotropy.

15. A computer system, comprising:
a computer memory; and
a hardware processor interoperably coupled with the computer memory and configured to perform operations comprising:
deriving transient responses of a tri-axial resistivity tool corresponding to an electromagnetic (EM) impulse;
deriving a transient response of a directional resistivity tool (DRT) corresponding to the EM impulse based on the transient responses of the tri-axial resistivity tool;
deriving a theoretical late time transient response of the DRT based on the transient response of the DRT;
measuring the late time transient response of the DRT; and
determining an anisotropy, a horizontal conductivity, and a dip angle based on the measured late time transient response and the theoretical late time transient response, including:
determining, using a first combination of values of the anisotropy, the horizontal conductivity, and the dip angle, a first error between the measured late time transient response and the theoretical late time transient response;
determining, using a second combination of values of the anisotropy, the horizontal conductivity, and the dip angle, a second error between the measured late time transient response and the theoretical late time transient response; and
determining the anisotropy, the horizontal conductivity and the dip angle from either the first combination of values or the second combination of values responsive to a comparison of the first error and the second error.

16. The computer system of claim 15, wherein the DRT includes one transmitter and one receiver, at least one of a dipole of the transmitter or a dipole of the receiver tilted from a tool axis.

17. The computer system of claim 16, wherein the tri-axial resistivity tool includes three mutually orthogonal transmitters and three mutually orthogonal receivers, the transmitters and the receivers of the tri-axial resistivity tool co-located with the transmitter and the receiver of the DRT, respectively.

18. The computer system of claim 15, wherein deriving the theoretical late time transient response includes having a time in the transient response approach to a large value.

19. The computer system of claim 15, wherein measuring the late time transient response includes measuring the late time transient response at different azimuth angles.

20. The computer system of claim 15, wherein determining the anisotropy, the horizontal conductivity, and the dip angle includes choosing the anisotropy, the horizontal conductivity, and the dip angle such that a difference between the measured late time transient response and the theoretical late time transient response is minimized.

* * * * *

UNITED STATES PATENT AND TRADEMARK OFFICE
CERTIFICATE OF CORRECTION

| | |
|---|---|
| PATENT NO. | : 10,774,636 B2 |
| APPLICATION NO. | : 16/230626 |
| DATED | : September 15, 2020 |
| INVENTOR(S) | : Teruhiko Hagiwara |

It is certified that error appears in the above-identified patent and that said Letters Patent is hereby corrected as shown below:

On the Title Page

Column 1, item (63) Related U.S. Application Data, Line 1, delete "15/156,964," and insert -- 15/156,984 --

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*